United States Patent
Brown et al.

(10) Patent No.: US 12,079,628 B2
(45) Date of Patent: *Sep. 3, 2024

(54) APPARATUS AND METHOD FOR LOOP FLATTENING AND REDUCTION IN A SINGLE INSTRUCTION MULTIPLE DATA (SIMD) PIPELINE

(71) Applicant: Intel Corporation, Santa Clara, CA (US)

(72) Inventors: William M. Brown, Beaverton, OR (US); Roland Schulz, Portland, OR (US); Karthik Raman, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/493,667

(22) Filed: Oct. 4, 2021

(65) Prior Publication Data

US 2022/0100509 A1 Mar. 31, 2022

Related U.S. Application Data

(63) Continuation of application No. 16/554,169, filed on Aug. 28, 2019, now Pat. No. 11,138,008, which is a
(Continued)

(51) Int. Cl.
*G06F 9/30* (2018.01)
*G06F 9/38* (2018.01)

(52) U.S. Cl.
CPC ...... *G06F 9/30032* (2013.01); *G06F 9/30018* (2013.01); *G06F 9/30036* (2013.01);
(Continued)

(58) Field of Classification Search
CPC ............. G06F 9/30032; G06F 9/30018; G06F 9/30036
See application file for complete search history.

(56) References Cited

U.S. PATENT DOCUMENTS

| 4,729,095 A | 3/1988 | Colley et al. |
| 6,859,455 B1 | 2/2005 | Yazdani et al. |
| (Continued) | | |

OTHER PUBLICATIONS

Krichene et al., "Broadcast with mask on a Massively Parallel Processing on a Chip", retrieved from https://hal.archives-ouvertes.fr/hal-00688418/, hal-00688418, Version-1, Apr. 23, 2012, 7 pages.
(Continued)

*Primary Examiner* — Courtney P Spann
(74) *Attorney, Agent, or Firm* — Nicholson De Vos Webster & Elliott LLP

(57) ABSTRACT

An apparatus and method for loop flattening and reduction in a SIMD pipeline including broadcast, move, and reduction instructions. For example, one embodiment of a processor comprises: a decoder to decode a broadcast instruction to generate a decoded broadcast instruction identifying a plurality of operations, the broadcast instruction including an opcode, first and second source operands, and at least one destination operand, the broadcast instruction having a split value associated therewith; a first source register associated with the first source operand to store a first plurality of packed data elements; a second source register associated with the second source operand to store a second plurality of packed data elements; execution circuitry to execute the operations of the decoded broadcast instruction, the execution circuitry to copy a first number of contiguous data elements from the first source register to a first set of contiguous data element locations in a destination register specified by the destination operand, the execution circuitry to further copy a second number of contiguous data elements
(Continued)

from the second source register to a second set of contiguous data element locations in the destination register, wherein the execution circuitry is to determine the first number and the second number in accordance with the split value associated with the broadcast instruction.

21 Claims, 20 Drawing Sheets

Related U.S. Application Data continuation of application No. 15/859,046, filed on Dec. 29, 2017, now Pat. No. 10,409,601.

(52) U.S. Cl.
CPC ...... *G06F 9/30098* (2013.01); *G06F 9/30145* (2013.01); *G06F 9/3887* (2013.01)

(56) References Cited

U.S. PATENT DOCUMENTS

| | | | |
|---|---|---|---|
| 7,228,401 B2 | 6/2007 | Moyer | |
| 9,588,766 B2 * | 3/2017 | Caprioli | G06F 9/30014 |
| 10,248,527 B1 | 4/2019 | Miller et al. | |
| 10,409,601 B2 * | 9/2019 | Brown | G06F 9/30145 |
| 2017/0286109 A1 | 10/2017 | Jha | |
| 2017/0337241 A1 | 11/2017 | Newbern et al. | |
| 2019/0303155 A1 * | 10/2019 | Eapen | G06F 9/30109 |

OTHER PUBLICATIONS

Notice of Allowance, U.S. Appl. No. 16/554,169, Jun. 4, 2021, 15 pages.

* cited by examiner

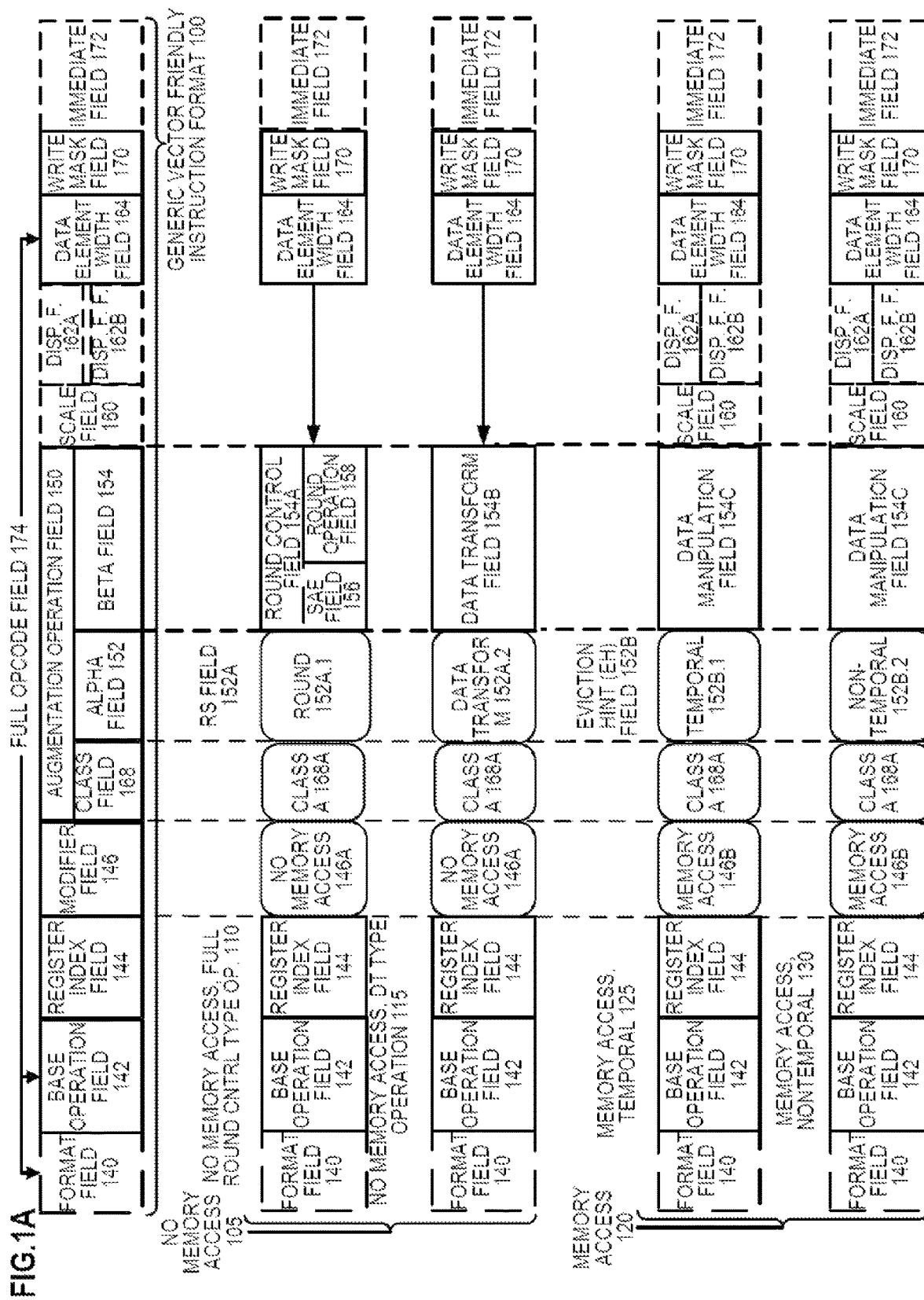

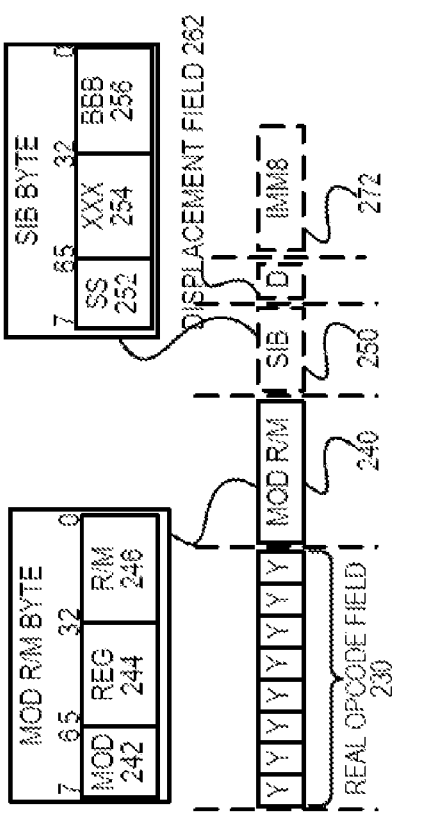
FIG. 2A
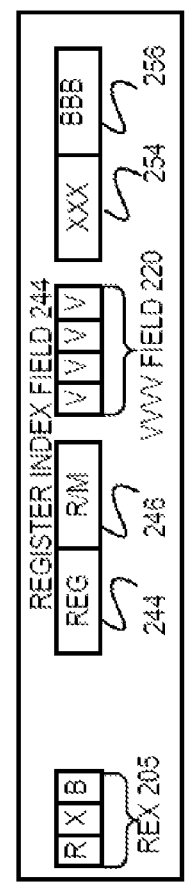
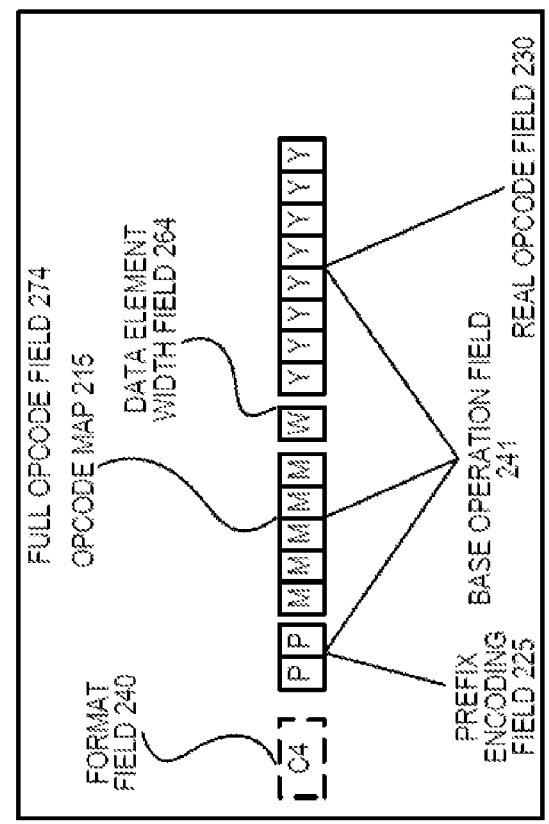
FIG. 2C
FIG. 2B

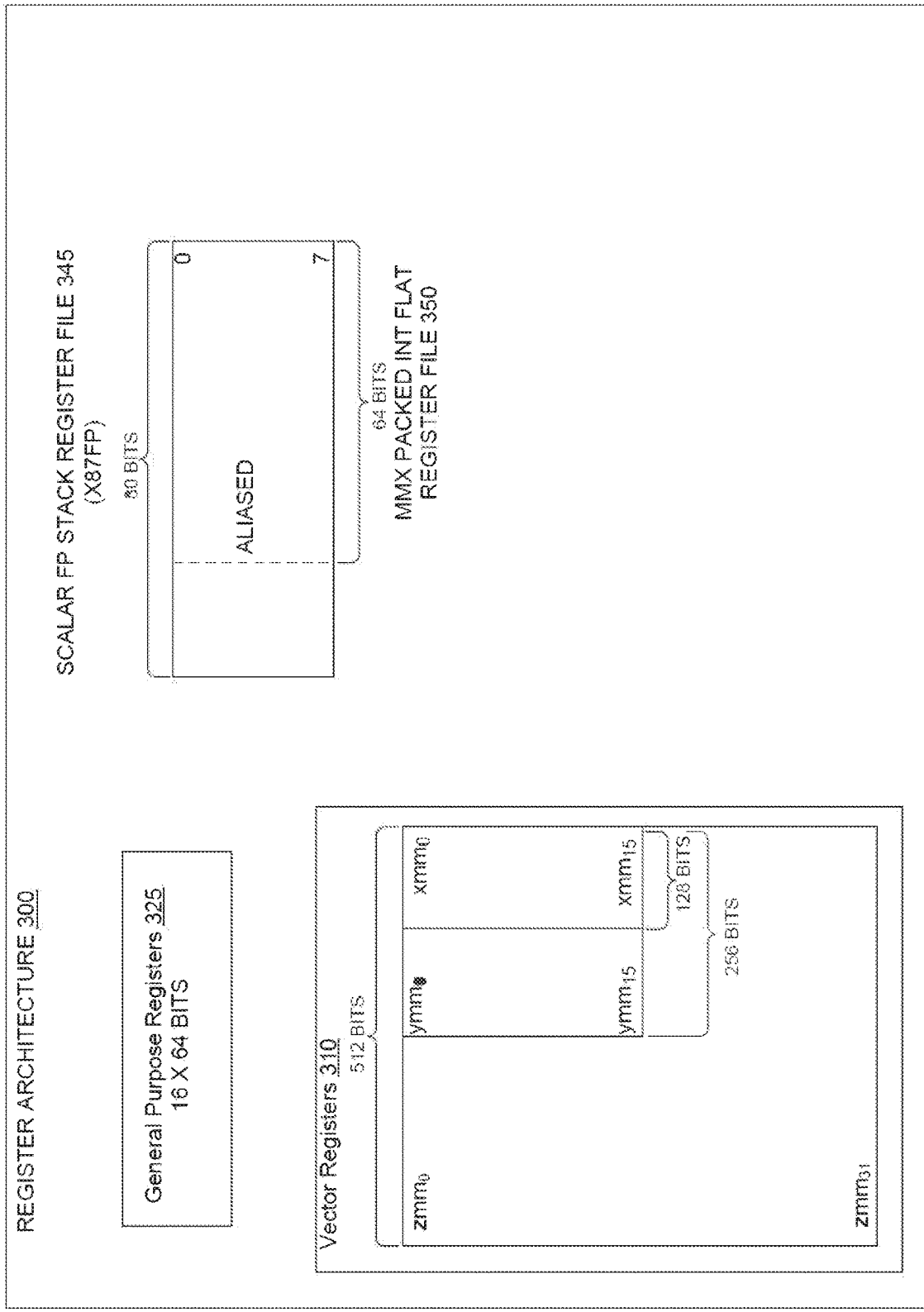

$$e\_sum, f\_sum = \text{VPREDUCE2S}\begin{pmatrix} e0 & e1 & e2 & e3 & e4 & e5 & e6 & e7 \\ f0 & f1 & f2 & f3 & f4 & f5 & f6 & f7 \end{pmatrix} =$$

$$\begin{array}{|c|c|c|c|c|c|c|c|} \hline e0 & f0 & e2 & f2 & e4 & f4 & e6 & f6 \\ \hline \end{array} + \begin{array}{|c|c|c|c|c|c|c|c|} \hline e1 & f1 & e3 & f3 & e5 & f5 & e7 & f7 \\ \hline \end{array}$$

$$\downarrow$$

$$\begin{array}{|c|c|c|c|c|c|c|c|} \hline e0+e1 & f0+f1 & X & X & e4+e5 & f4+f5 & X & X \\ \hline \end{array} + \begin{array}{|c|c|c|c|c|c|c|c|} \hline e2+e3 & f2+f3 & X & X & e6+e7 & f6+f7 & X & X \\ \hline \end{array}$$

$$\downarrow$$

$$\begin{array}{|c|c|c|c|c|c|c|c|} \hline e0+e1+e2+e3 & f0+f1+f2+f3 & X & X & X & X & X & X \\ \hline \end{array} + \begin{array}{|c|c|c|c|c|c|c|c|} \hline e4+e5+e6+e7 & f4+f5+f6+f7 & X & X & X & X & X & X \\ \hline \end{array}$$

*Fig. 16*

APPARATUS AND METHOD FOR LOOP FLATTENING AND REDUCTION IN A SINGLE INSTRUCTION MULTIPLE DATA (SIMD) PIPELINE

CROSS REFERENCE TO RELATED APPLICATIONS

This application is a continuation of co-pending U.S. patent application Ser. No. 16/554,169 filed on Aug. 28, 2019, which is continuation of U.S. application Ser. No. 15/859,046, filed on Dec. 29, 2017, now U.S. Issued Pat. No. 10,409,601, issued on Sep. 10, 2019, all of which is hereby incorporated by reference.

BACKGROUND

Field of the Invention

The embodiments of the invention relate generally to the field of computer processors. More particularly, the embodiments of the invention relate to an apparatus and method for loop flattening and reduction in a single instruction multiple data (SIMD) processor pipeline.

Description of the Related Art

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale CA implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

Single Instruction Multiple Data (SIMD) is an architecture for simultaneously processing multiple data elements packed into registers in response to a single instruction. For example, 16 doubleword values (32-bits in size) packed into a single 512-bit register may be distributed to functional units via SIMD "lanes" so that the functional units can perform concurrent operations on the data elements. By way of example, and not limitation, the operations may include multiplications of individual data elements, accumulations of the resulting products, permutation/move operations such as swapping positions of the data elements with other data elements, and reduction operations which combine one or more groups of data elements into one.

BRIEF DESCRIPTION OF THE DRAWINGS

A better understanding of the present invention can be obtained from the following detailed description in conjunction with the following drawings, in which:

FIGS. 1A and 1B are block diagrams illustrating a generic vector friendly instruction format and instruction templates thereof according to embodiments of the invention;

FIGS. 2A-C are block diagrams illustrating an exemplary VEX instruction format according to embodiments of the invention;

FIG. 3 is a block diagram of a register architecture according to one embodiment of the invention.

FIG. 12 illustrates data packed in exemplary SIMD registers;

FIG. 16 illustrates data operations performed in response to a vector reduction instruction in accordance with an embodiment of the invention;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures, Instruction Formats, and Data Types

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source/destination and source2); and an occurrence of this ADD instruction in an instruction stream will have specific contents in the operand fields that select specific operands.

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 1B:
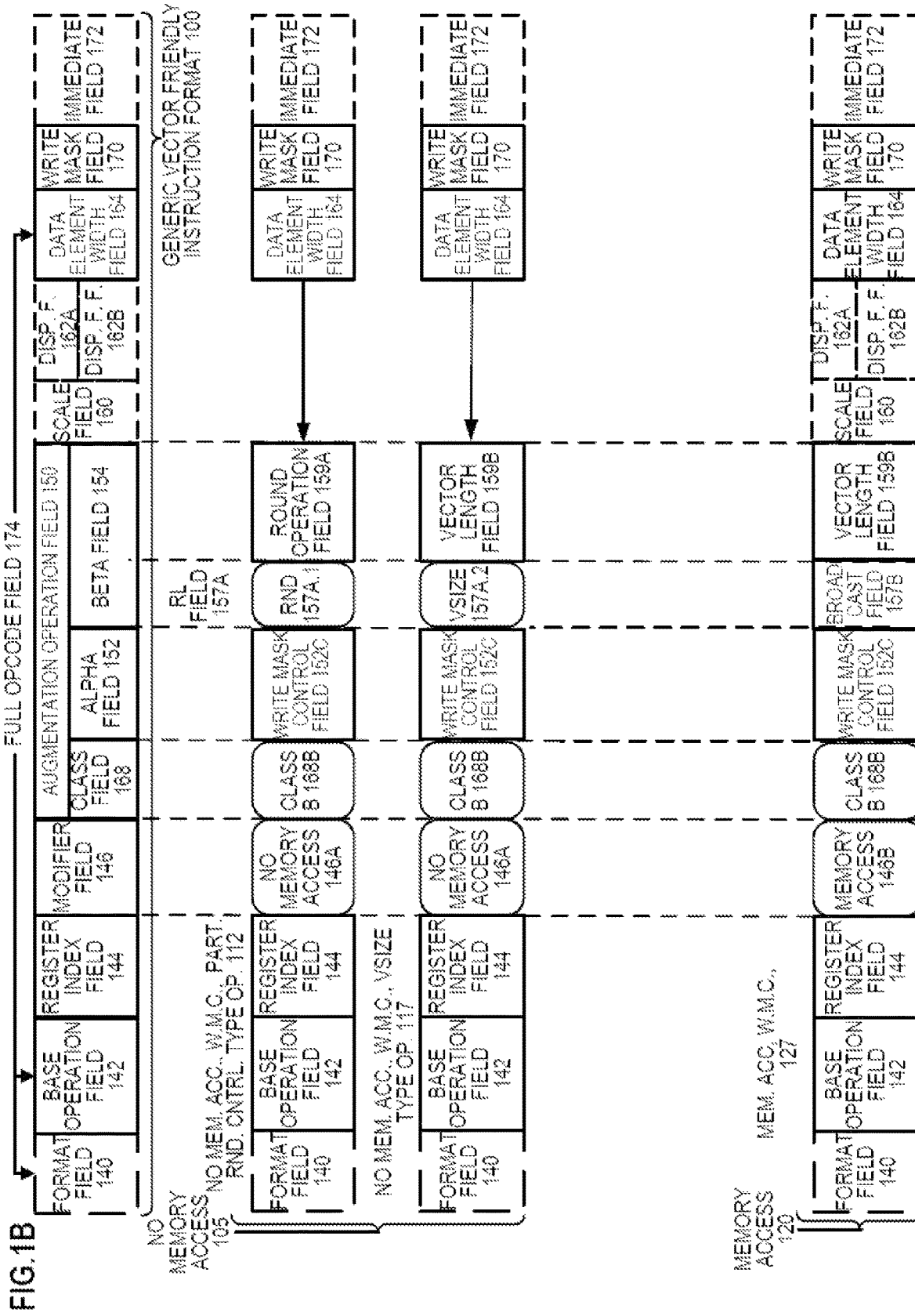

FIGS. 1A-1B are block diagrams illustrating a generic vector friendly instruction format and instruction templates thereof according to embodiments of the invention. FIG. 1A is a block diagram illustrating a generic vector friendly instruction format and class A instruction templates thereof according to embodiments of the invention; while FIG. 1B is a block diagram illustrating the generic vector friendly instruction format and class B instruction templates thereof according to embodiments of the invention. Specifically, a generic vector friendly instruction format 100 for which are defined class A and class B instruction templates, both of which include no memory access 105 instruction templates and memory access 120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 1A include: 1) within the no memory access 105 instruction templates there is shown a no memory access, full round control type operation 110 instruction template and a no memory access, data transform type operation 115 instruction template; and 2) within the memory access 120 instruction templates there is shown a memory access, temporal 125 instruction template and a memory access, non-temporal 130 instruction template. The class B instruction templates in FIG. 1B include: 1) within the no memory access 105 instruction templates there is shown a no memory access, write mask control, partial round control type operation 112 instruction template and a no memory access, write mask control, vsize type operation 117 instruction template; and 2) within the memory access 120 instruction templates there is shown a memory access, write mask control 127 instruction template.

The generic vector friendly instruction format 100 includes the following fields listed below in the order illustrated in FIGS. 1A-1B.

Format field 140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 142—its content distinguishes different base operations.

Register index field 144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 146—its content distinguishes occurrences of instructions in the generic vector instruction format that specify memory access from those that do not; that is, between no memory access 105 instruction templates and memory access 120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 150—its content distinguishes which one of a variety of different operations to be performed in addition to the base operation. This field is context specific. In one embodiment of the invention, this field is divided into a class field 168, an alpha field 152, and a beta field 154. The augmentation operation field 150 allows common groups of operations to be performed in a single instruction rather than 2, 3, or 4 instructions.

Scale field 160—its content allows for the scaling of the index field's content for memory address generation (e.g., for address generation that uses $2^{scale}*\text{index}+\text{base}$).

Displacement Field 162A—its content is used as part of memory address generation (e.g., for address generation that uses $2^{scale}*\text{index}+\text{base}+\text{displacement}$).

Displacement Factor Field 162B (note that the juxtaposition of displacement field 162A directly over displacement factor field 162B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 174 (described later herein) and the data manipulation field 154C. The displacement field 162A and the displacement factor field 162B are optional in the sense that they are not used for the no memory access 105 instruction templates and/or different embodiments may implement only one or none of the two.

Data element width field 164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 170 allows for partial vector operations, including loads, stores, arithmetic, logical, etc. While embodiments of the invention are described in which the write mask field's 170 content selects one of a number of write mask registers that contains the write mask to be used (and thus the write mask field's 170 content indirectly identifies that masking to be performed), alternative embodiments instead or additional allow the mask write field's 170 content to directly specify the masking to be performed.

Immediate field 172—its content allows for the specification of an immediate. This field is optional in the sense that is it not present in an implementation of the generic vector friendly format that does not support immediate and it is not present in instructions that do not use an immediate.

Class field 168—its content distinguishes between different classes of instructions. With reference to FIGS. 1A-B, the contents of this field select between class A and class B instructions. In FIGS. 1A-B, rounded corner squares are used to indicate a specific value is present in a field (e.g., class A 168A and class B 168B for the class field 168 respectively in FIGS. 1A-B).

Instruction Templates of Class A

In the case of the non-memory access 105 instruction templates of class A, the alpha field 152 is interpreted as an RS field 152A, whose content distinguishes which one of the different augmentation operation types are to be performed (e.g., round 152A.1 and data transform 152A.2 are respectively specified for the no memory access, round type operation 110 and the no memory access, data transform type operation 115 instruction templates), while the beta field 154 distinguishes which of the operations of the specified type is to be performed. In the no memory access 105 instruction templates, the scale field 160, the displacement field 162A, and the displacement scale filed 162B are not present.

No-Memory Access Instruction Templates—Full Round Control Type Operation

In the no memory access full round control type operation 110 instruction template, the beta field 154 is interpreted as a round control field 154A, whose content(s) provide static rounding. While in the described embodiments of the invention the round control field 154A includes a suppress all floating point exceptions (SAE) field 156 and a round operation control field 158, alternative embodiments may support may encode both these concepts into the same field or only have one or the other of these concepts/fields (e.g., may have only the round operation control field 158).

SAE field 156—its content distinguishes whether or not to disable the exception event reporting; when the SAE field's 156 content indicates suppression is enabled, a given instruction does not report any kind of floating-point exception flag and does not raise any floating point exception handler.

Round operation control field 158—its content distinguishes which one of a group of rounding operations to perform (e.g., Round-up, Round-down, Round-towards-zero and Round-to-nearest). Thus, the round operation control field 158 allows for the changing of the rounding mode on a per instruction basis. In one embodiment of the invention where a processor includes a control register for specifying rounding modes, the round operation control field's 150 content overrides that register value.

No Memory Access Instruction Templates—Data Transform Type Operation

In the no memory access data transform type operation 115 instruction template, the beta field 154 is interpreted as a data transform field 154B, whose content distinguishes which one of a number of data transforms is to be performed (e.g., no data transform, swizzle, broadcast).

In the case of a memory access 120 instruction template of class A, the alpha field 152 is interpreted as an eviction hint field 152B, whose content distinguishes which one of the eviction hints is to be used (in FIG. 1A, temporal 152B.1 and non-temporal 152B.2 are respectively specified for the memory access, temporal 125 instruction template and the memory access, non-temporal 130 instruction template), while the beta field 154 is interpreted as a data manipulation field 154C, whose content distinguishes which one of a number of data manipulation operations (also known as primitives) is to be performed (e.g., no manipulation; broadcast; up conversion of a source; and down conversion of a destination). The memory access 120 instruction templates include the scale field 160, and optionally the displacement field 162A or the displacement scale field 162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 152 is interpreted as a write mask control (Z) field 152C, whose content distinguishes whether the write masking controlled by the write mask field 170 should be a merging or a zeroing.

In the case of the non-memory access 105 instruction templates of class B, part of the beta field 154 is interpreted as an RL field 157A, whose content distinguishes which one of the different augmentation operation types are to be performed (e.g., round 157A.1 and vector length (VSIZE) 157A.2 are respectively specified for the no memory access, write mask control, partial round control type operation 112 instruction template and the no memory access, write mask control, VSIZE type operation 117 instruction template), while the rest of the beta field 154 distinguishes which of the operations of the specified type is to be performed. In the no memory access 105 instruction templates, the scale field 160, the displacement field 162A, and the displacement scale filed 162B are not present.

In the no memory access, write mask control, partial round control type operation 110 instruction template, the rest of the beta field 154 is interpreted as a round operation field 159A and exception event reporting is disabled (a given instruction does not report any kind of floating-point exception flag and does not raise any floating point exception handler).

Round operation control field 159A—just as round operation control field 158, its content distinguishes which one of a group of rounding operations to perform (e.g., Round-up, Round-down, Round-towards-zero and Round-to-nearest). Thus, the round operation control field 159A allows for the changing of the rounding mode on a per instruction basis. In one embodiment of the invention where a processor includes a control register for specifying rounding modes, the round operation control field's 150 content overrides that register value.

In the no memory access, write mask control, VSIZE type operation 117 instruction template, the rest of the beta field 154 is interpreted as a vector length field 159B, whose content distinguishes which one of a number of data vector lengths is to be performed on (e.g., 128, 256, or 512 byte).

In the case of a memory access 120 instruction template of class B, part of the beta field 154 is interpreted as a broadcast field 157B, whose content distinguishes whether or not the broadcast type data manipulation operation is to be performed, while the rest of the beta field 154 is interpreted the vector length field 159B. The memory access 120 instruction templates include the scale field 160, and optionally the displacement field 162A or the displacement scale field 162B.

With regard to the generic vector friendly instruction format 100, a full opcode field 174 is shown including the format field 140, the base operation field 142, and the data element width field 164. While one embodiment is shown where the full opcode field 174 includes all of these fields, the full opcode field 174 includes less than all of these fields in embodiments that do not support all of them. The full opcode field 174 provides the operation code (opcode).

The augmentation operation field 150, the data element width field 164, and the write mask field 170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

VEX Instruction Format

VEX encoding allows instructions to have more than two operands, and allows SIMD vector registers to be longer than 28 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 2A illustrates an exemplary AVX instruction format including a VEX prefix 202, real opcode field 230, Mod R/M byte 240, SIB byte 250, displacement field 262, and IMM8 272. FIG. 2B illustrates which fields from FIG. 2A make up a full opcode field 274 and a base operation field 241. FIG. 2C illustrates which fields from FIG. 2A make up a register index field 244.

VEX Prefix (Bytes 0-2) 202 is encoded in a three-byte form. The first byte is the Format Field 290 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 205 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 215 (VEX byte 1, bits [4:0]-mmmmm) includes content to encode an implied leading opcode byte. W Field 264 (VEX byte 2, bit [7]-W)—is represented by the notation VEX.W, and provides different functions depending on the instruction. The role of VEX.vvvv 220 (VEX Byte 2, bits [6:3]-vvvv) may include the following: 1) VEX.vvvv encodes the first source register operand, specified in inverted (1 s complement) form and is valid for instructions with 2 or more source operands; 2) VEX.vvvv encodes the destination register operand, specified in 1 s complement form for certain vector shifts; or 3) VEX.vvvv does not encode any operand, the field is reserved and should contain 1111b. If VEX.L 268 Size field (VEX byte 2, bit [2]-L)=0, it indicates 28 bit vector; if VEX.L=1, it indicates 256 bit vector. Prefix encoding field 225 (VEX byte 2, bits [1:0]-pp) provides additional bits for the base operation field 241.

Real Opcode Field 230 (Byte 3) is also known as the opcode byte. Part of the opcode is specified in this field.

MOD R/M Field 240 (Byte 4) includes MOD field 242 (bits [7-6]), Reg field 244 (bits [5-3]), and R/M field 246 (bits [2-0]). The role of Reg field 244 may include the following: encoding either the destination register operand or a source register operand (the rrr of Rrrr), or be treated as an opcode extension and not used to encode any instruction operand. The role of R/M field 246 may include the following: encoding the instruction operand that references a memory address, or encoding either the destination register operand or a source register operand.

Scale, Index, Base (SIB)—The content of Scale field 250 (Byte 5) includes SS252 (bits [7-6]), which is used for memory address generation. The contents of SIB.xxx 254 (bits [5-3]) and SIB.bbb 256 (bits [2-0]) have been previously referred to with regard to the register indexes Xxxx and Bbbb.

The Displacement Field 262 and the immediate field (IMM8) 272 contain data.

Exemplary Register Architecture

FIG. 3 is a block diagram of a register architecture 300 according to one embodiment of the invention. In the embodiment illustrated, there are 32 vector registers 310 that are 512 bits wide; these registers are referenced as zmm0 through zmm31. The lower order 256 bits of the lower 6 zmm registers are overlaid on registers ymm0-15. The lower order 128 bits of the lower 6 zmm registers (the lower order 128 bits of the ymm registers) are overlaid on registers xmm0-15.

General-purpose registers 325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 345, on which is aliased the MMX packed integer flat register file 350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

Figure 4A:
FIG. 4A is a block diagram illustrating both an exemplary in-order fetch, decode, retire pipeline and an exemplary register renaming, out-of-order issue/execution pipeline according to embodiments of the invention.
Figure 4B:
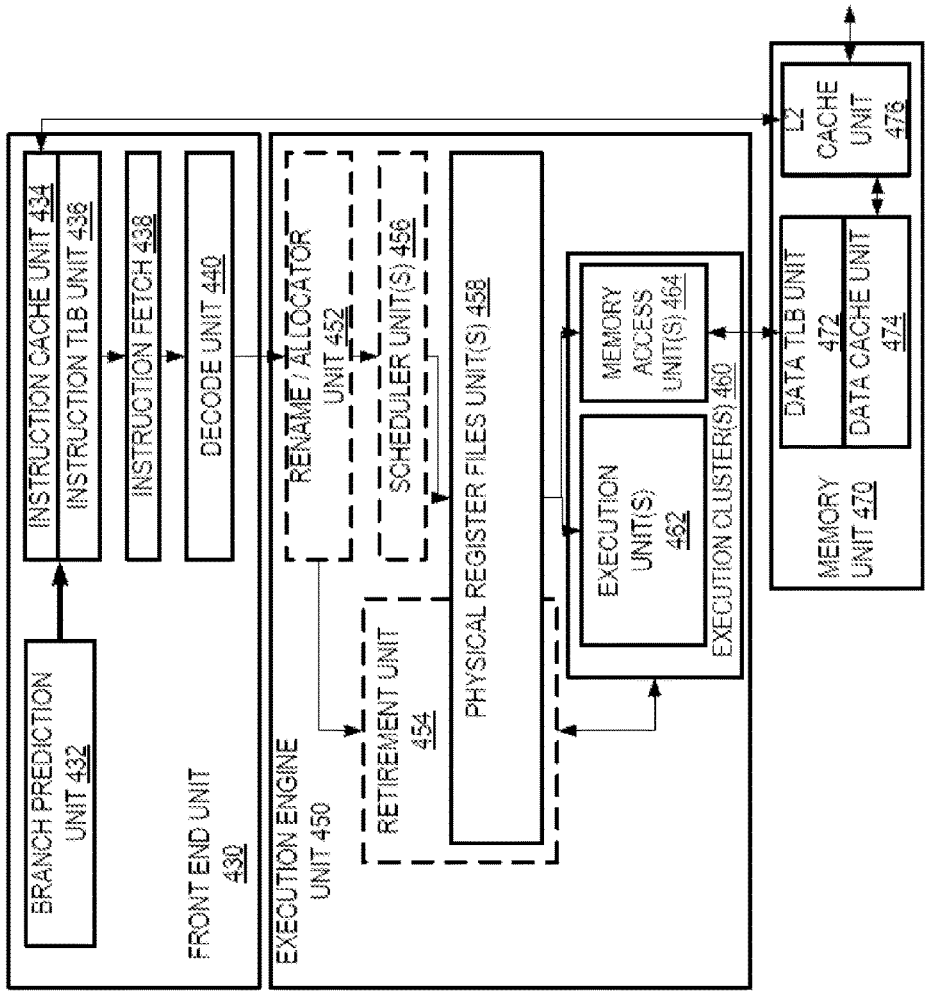
FIG. 4B is a block diagram illustrating both an exemplary embodiment of an in-order fetch, decode, retire core and an exemplary register renaming, out-of-order issue/execution architecture core to be included in a processor according to embodiments of the invention.

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 5B:
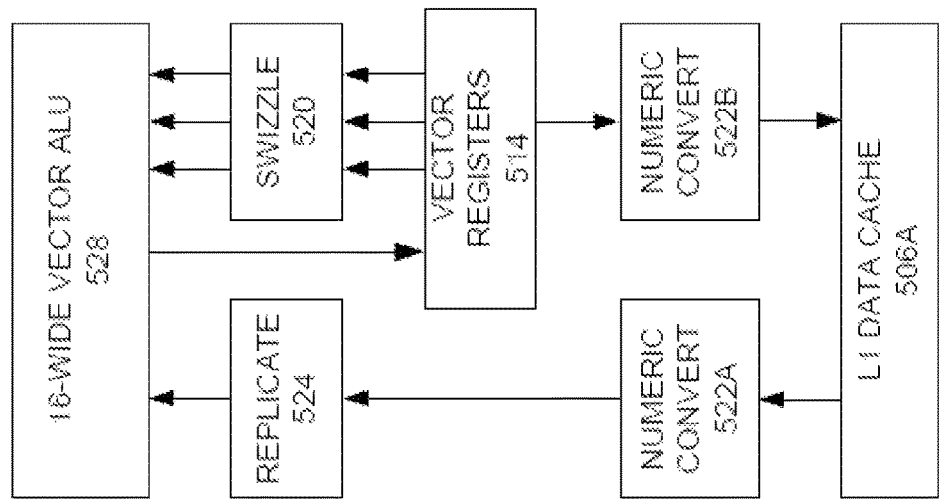
FIG. 5B illustrates an expanded view of part of the processor core in FIG. 5A according to embodiments of the invention.
Figure 5A:
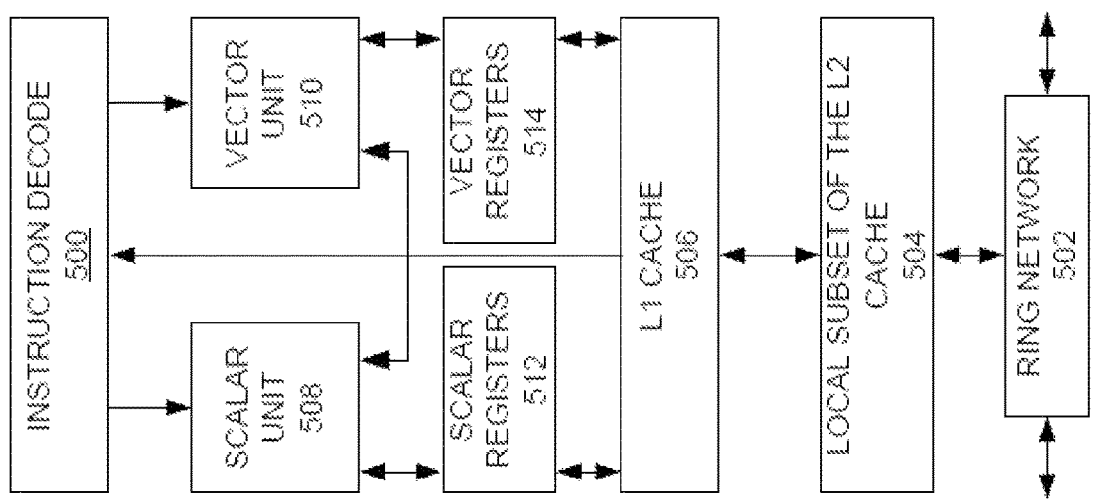
FIG. 5A is a block diagram of a single processor core, along with its connection to an on-die interconnect network.

FIGS. 5A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 5B is an expanded view of part of the processor core in FIG. 5A according to embodiments of the invention. FIG. 5B includes an L1 data cache 506A part of the L1 cache 504, as well as more detail regarding the vector unit 510 and the vector registers 514. Specifically, the vector unit 510 is a 6-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input.

Processor with Integrated Memory Controller and Graphics

Figure 6:
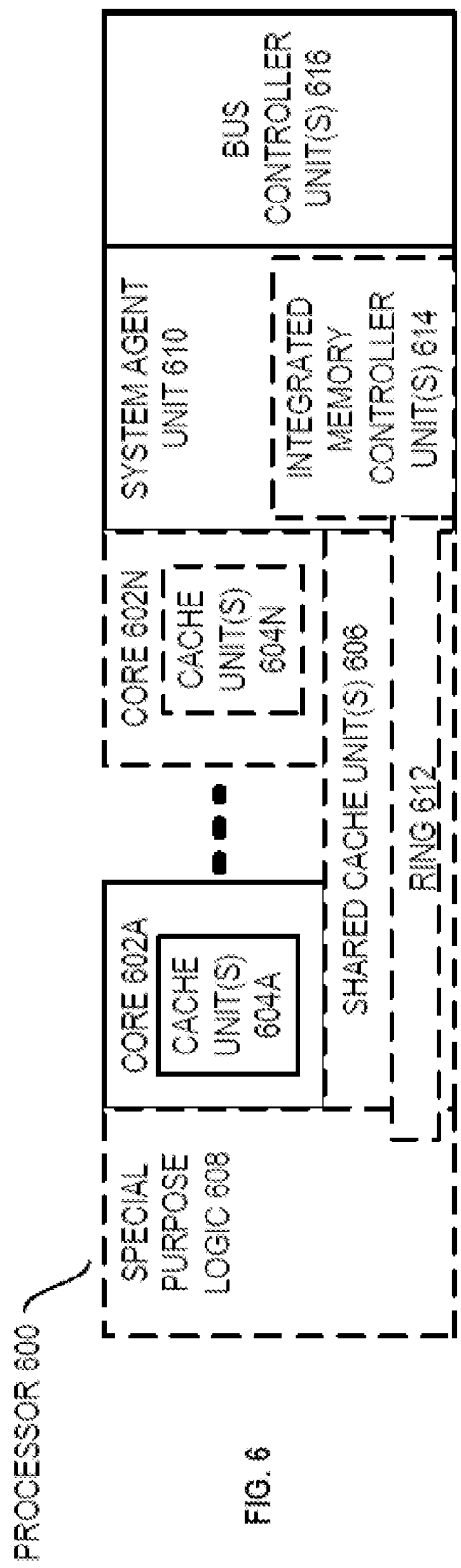
FIG. 6 is a block diagram of a single core processor and a multicore processor with integrated memory controller and graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores 604A-N, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Exemplary Computer Architectures

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
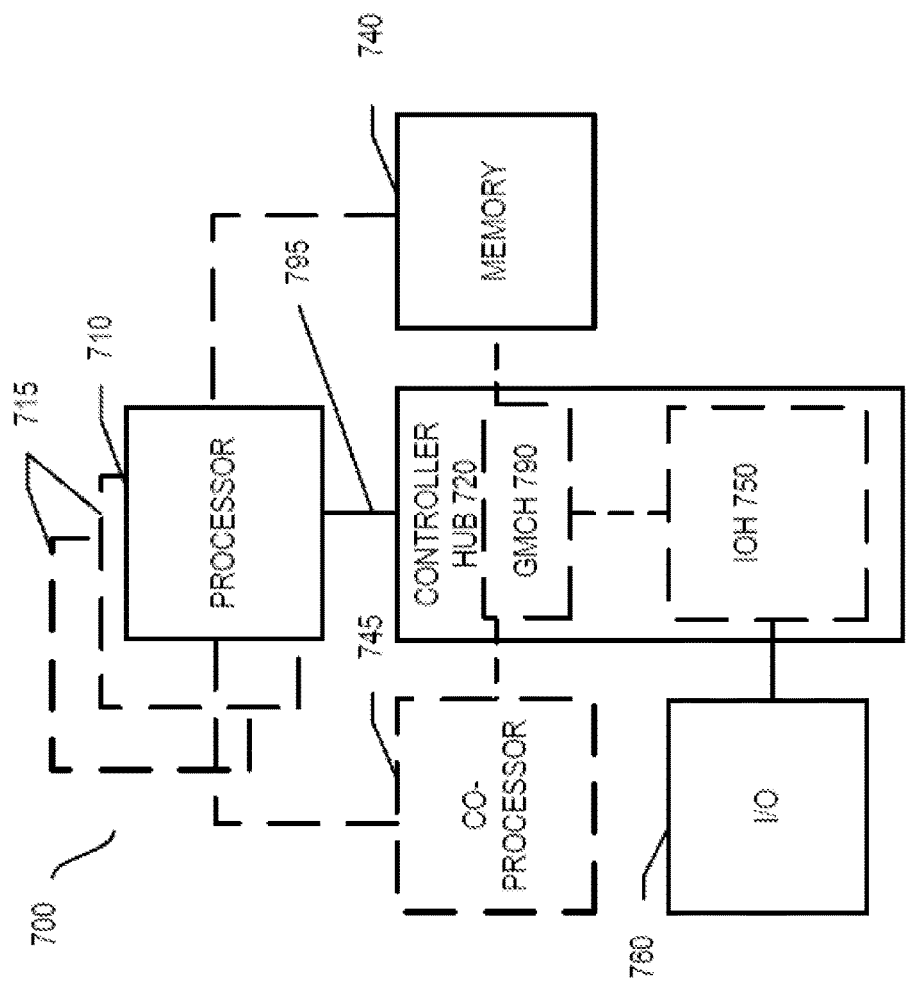
FIG. 7 illustrates a block diagram of a system in accordance with one embodiment of the present invention.

Referring now to FIG. 7, shown is a block diagram of a system 700 in accordance with one embodiment of the present invention. The system 700 may include one or more processors 710, 715, which are coupled to a controller hub 720. In one embodiment, the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface, or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 7155 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
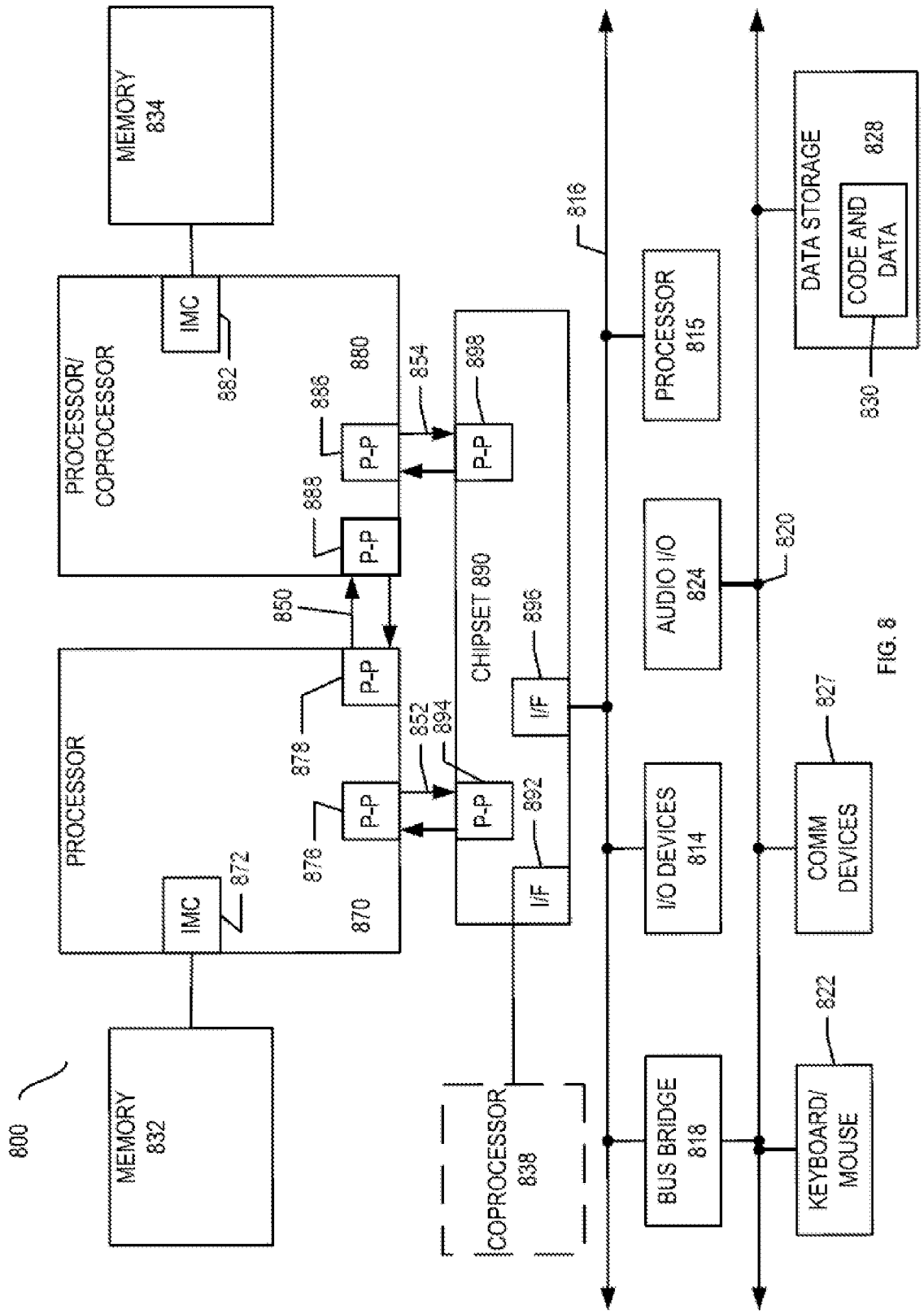
FIG. 8 illustrates a block diagram of a second system in accordance with an embodiment of the present invention.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 892. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 816. Note that other architectures are possible. For example, instead of the point-to-point architecture of FIG. 8, a system may implement a multi-drop bus or other such architecture.

Figure 9:
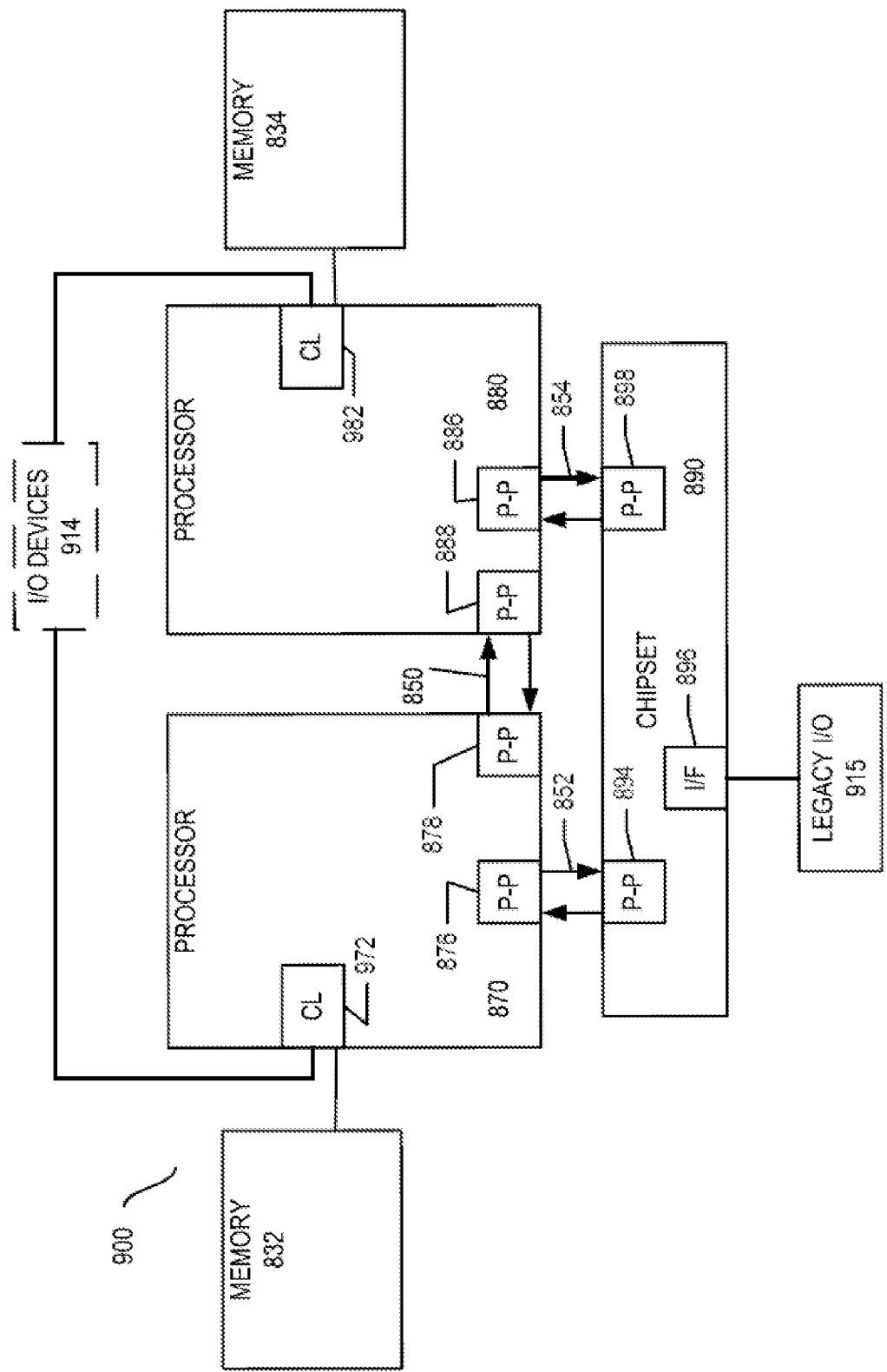
FIG. 9 illustrates a block diagram of a third system in accordance with an embodiment of the present invention.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 972 and 982, respectively. Thus, the CL 972, 982 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
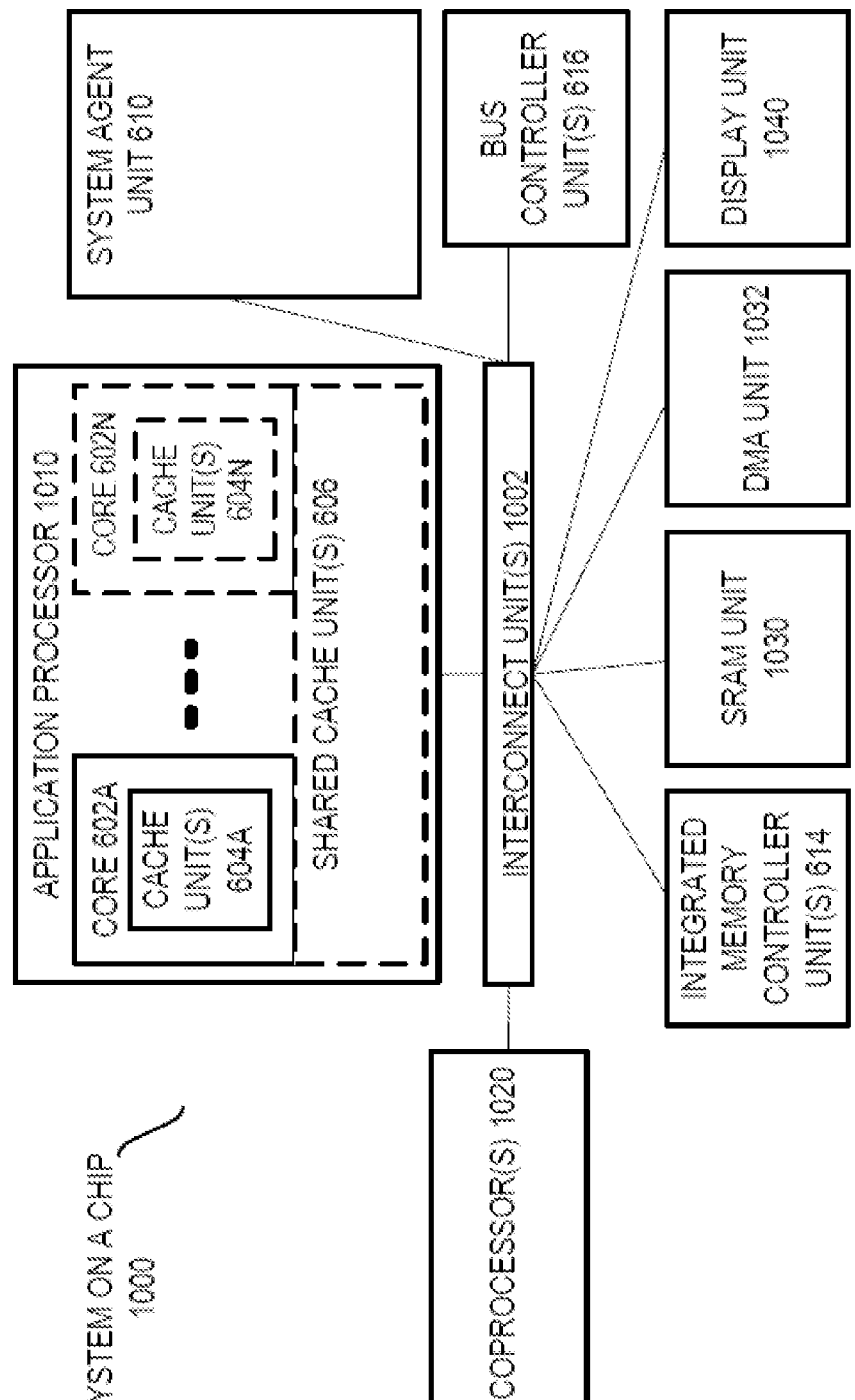
FIG. 10 illustrates a block diagram of a system on a chip (SoC) in accordance with an embodiment of the present invention.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 102A-N, cache units 604A-N, and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
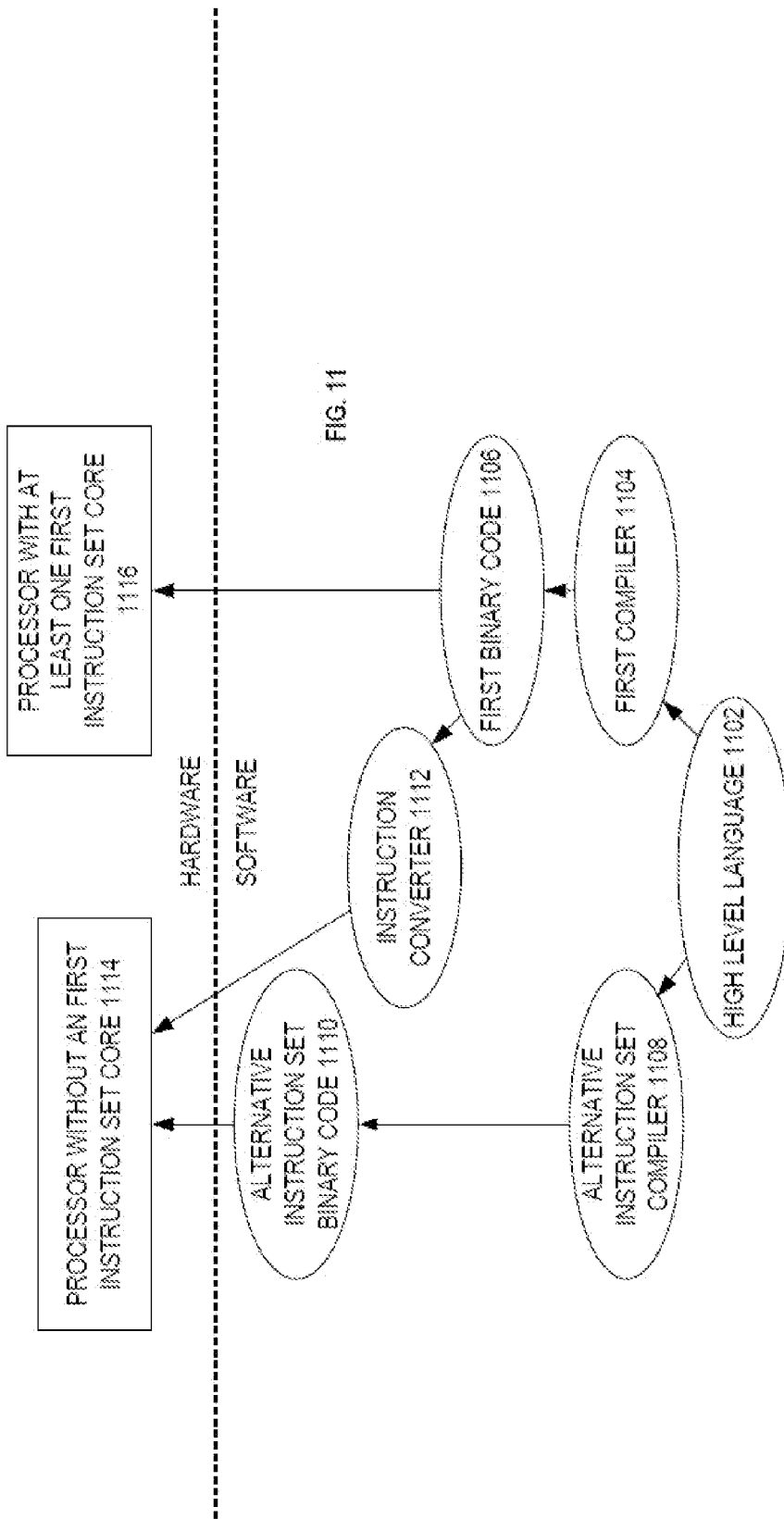
FIG. 11 illustrates a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an first compiler 1104 to generate a first binary code (e.g., x86) 1106 that may be natively executed by a processor with at least one first instruction set core 1116. In some embodiments, the processor with at least one first instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1104 represents a compiler that is operable to generate binary code of the first instruction set 1106 (e.g., object code) that can, with or without additional linkage processing, be executed on the processor with at least one first instruction set core 1116. Similarly, FIG. 11 shows the program in the high level language 1102 may be compiled using an alternative instruction set compiler 1108 to generate alternative instruction set binary code 1110 that may be natively executed by a processor without at least one first instruction set core 1114 (e.g., a processor with cores that execute the MIPS instruction set of MIPS Technologies of Sunnyvale, CA and/or that execute the ARM instruction set of ARM Holdings of Sunnyvale, CA). The instruction converter 1112 is used to convert the first binary code 1106 into code that may be natively executed by the processor without an first instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have a first instruction set processor or core to execute the first binary code 1106.

Apparatus and Method for Loop Flattening and Reduction in a Single-Instruction Multiple-Data Pipeline When insufficient data elements are available to fully utilize the available SIMD width of the processor's functional units, predication or scalar calculation can be required to prevent erroneous results, exceptions, or faults from the SIMD operations on unused elements. Electrical energy may be wasted performing the SIMD calculation when only a smaller number of data elements are required and the realized performance gain from the vector calculation compared to the scalar calculations is low. For example, in molecular dynamics algorithms, a loop over each atom's neighbors is required to calculate a force for each atom. For some simulation models, the number of neighbors can be very low. In the case of an average of 24 neighbors with single precision vector calculations across only the inner loop, there is an approximately 25% waste in the use of the vector hardware due to calculations with unused vector elements.

For nested loops, an alternative to predication/scalar calculations is to use "loop flattening." In this case, the unused elements at the end of one inner SIMD loop can be used for calculations for the first elements in the next inner SIMD loop to be calculated. Unfortunately, it is not always straightforward to merge data elements from multiple outer loop iterations. In the case of molecular dynamics, for example, the inner loop might involve calculations of a force that is a function of the distance between a single atom and all of its neighbors. With loop flattening, SIMD calculations may involve the distance between two atoms i and i+1 and two sets of neighbor lists. Where a single broadcast for the x position of atom i could be sufficient for only the inner loop for a single atom, doing two atoms requires multiple instructions to arrange the elements for SIMD calculation. Likewise, vector loads and stores might involve two memory pointers instead of one and data element reductions within a vector are spread across subsets of the elements and require multiple results.

In the case of horizontal operations involving operators using multiple elements of a single SIMD vector, inefficient use of vector hardware can also occur. As an example, horizontal reduction to sum the elements of a vector can be calculated using tree reduction where each step of the calculation uses fewer data elements. It is often the case, however, that multiple vectors require reduction. By using two vector sources with two results, the number of full-width SIMD arithmetic operations can be halved compared to calculating them separately. This can allow for greater performance when dedicated logic for horizontal reductions is not available.

Current instruction set architectures (ISAs) do not have support for multi-source reductions or broadcasts with an arbitrary split point. Although instructions such as vbroadcastf32×2 can take multiple sources, they are not capable of controlling the split point for loop flattening. Moreover, the vinsertf32×8 instruction can be used for a multisource data element move, but these instructions are limited because 8 elements are always used from the second source vector. In contrast, one embodiment of the invention performs two-address vector load/store operations on contiguous elements which is uniquely useful for efficient loop flattening.

In particular, the embodiments of the invention include instructions which improve the efficiency of SIMD hardware when performing operations such as loop-flattening and horizontal reduction. In one embodiment, the instructions have multiple sources and/or a split point to reduce the instruction counts of data movement, merging and reduction. They also allow for decreased latency and improved use of the core pipeline for instruction-level parallelism and simultaneous multithreading with long-latency operations.

Instructions taking multiple sources for SIMD operations and/or a split point, can reduce the instruction counts required for efficient SIMD with loop flattening and/or horizontal operations. For example, when two vectors require reduction across multiple elements, this can potentially be accomplished with fewer SIMD operations than required for doing the two reductions separately. Similarly, load, store, and broadcast operations with two sources are improved by merging data elements needed from different iterations of the outer loop.

By way of example, and not limitation, consider the common case of a nested loop with a variable inner-loop trip count, for example:

```
for i := 0 to ni
    for j := 0 to nj[i]
        ans[i] += FOO(a[i] + b[i][j]);
    endfor
endfor
```

An example of vector code to execute the inner loop using existing SIMD implementations might operate in accordance with the following code:

```
for i := 0 to ni
    // Copy a[i] into every element of SIMD vector v1
    v1 = VPBROADCAST(a[i])
    // Set all elements of answer vector to 0
    v4 = VPBROADCAST(0)
    j := 0
    repeat
        // Set mask in element n of mask vector k1 if j + n >= nj
        k1 = MASK_REMAINDER(j, nj[i])
        // Load values from memory address b[i] into vector based on
    mask
        v2 = VPMOV(b[i]+j, k1)
        // a[i]+b[j]
        v3 = VPADD(v1,v2)
        // FOO(a[i] + b[i][j])
        v4 = VPADD(v4, FOO(v3), k1)
        j := j + SIMD_WIDTH
```

-continued

```
        until j > nj[i]
        // Reduce into a single answer
        ans[i] = VPREDUCE(v4,k1,ENUM_SUM);
endfor
```

In the above code, because nj will not necessarily be a multiple of the SIMD vector width, some method to mask SIMD operations to prevent erroneous results, faults, or exceptions from unused vector elements (or lanes) is required. In this example, a vector mask, k1, is used that guarantees SIMD operations are safe and correct. This introduces inefficiency in the vectorization because the speedup will be limited and electrical energy efficiency can be wasted.

For this example, the inefficiency in the last vector iteration is illustrated in FIG. 12, for a SIMD width of 8, where unused data elements are marked by an X. Moreover, this inefficiency will tend to increase as nj decreases or as the SIMD vector width increases. Vectorization of the outer loop can result in greater inefficiency when the variance in nj is high due to a similar issue of unused lanes where the inefficiency for the remainder is no longer bounded by 1/SIMD_WIDTH.

Figure 13:
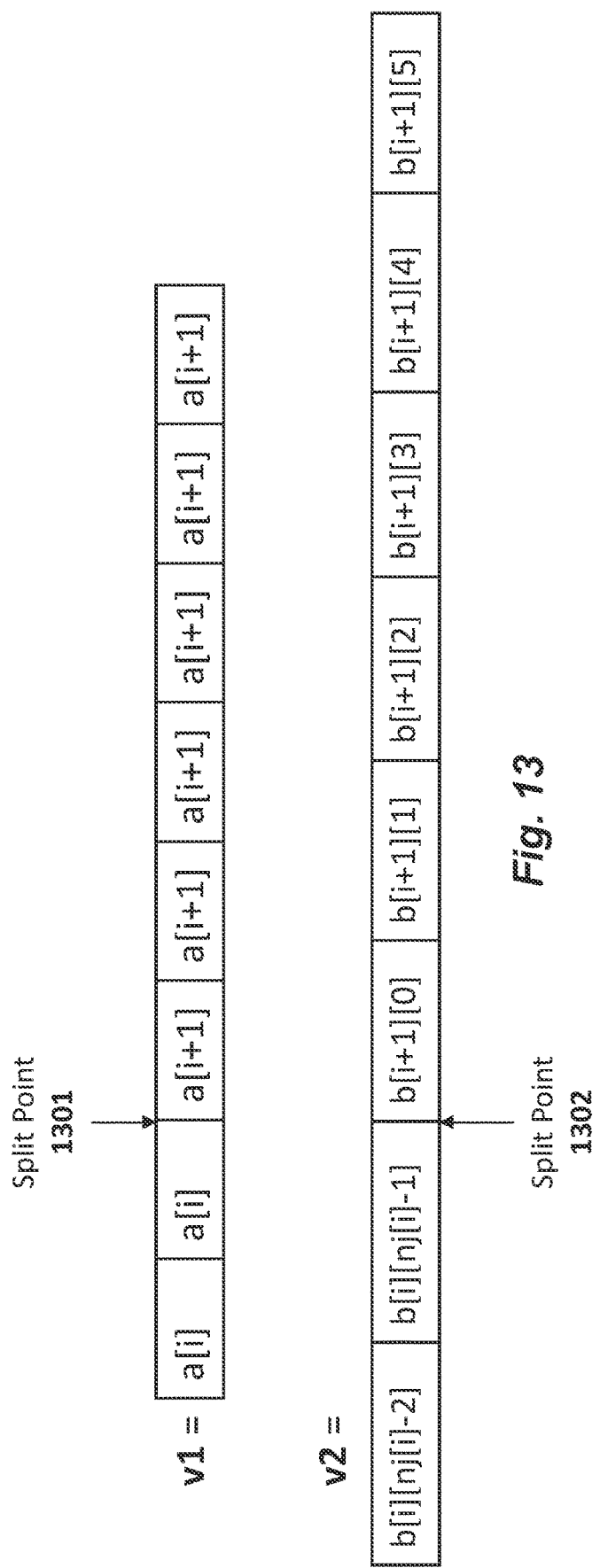
FIG. 13 illustrates SIMD data packed in accordance with a split value.

Loop flattening techniques provide an alternative that can improve efficiency where the wasted lanes occur only once at the end of the nested loop. In this case, a single SIMD calculation can be used for the last inner loop iterations for i and the first for i+1. This is illustrated in FIG. 13 which shows split points 1301 and 1302 in registers v1 and v2, respectively. In particular, in v1, values a[i+1] are stored in data elements to the right of the split point 1301 while values a[i] remain to the left. Similarly, values from array b[i+1] are stored in data elements to the right of the split point 1302 while the values b[i][nj[i]−2] and b[i][nj[i]−1] remain to the left. Given the need for both sets of values for the last and first inner loop iterations for i and i+1, respectively, the arrangement of data provides significant performance improvements over prior implementations.

The potential improvement in vector efficiency is limited by existing instructions. As such, the embodiments of the invention include additional instructions capable of managing elements from the different iterations of the outer loop. These embodiments include: (1) a single instruction to perform a broadcast of two values (a[i] and a[i]+1 in this example) with a specified split point; (2) a single instruction to move/load contiguous elements from two different memory address into a single SIMD vector (b[i] and b[i+1] in this example) with a specified split point; and (3) a single instruction to perform separate reductions, or store contiguous values into two memory locations.

Figure 14:
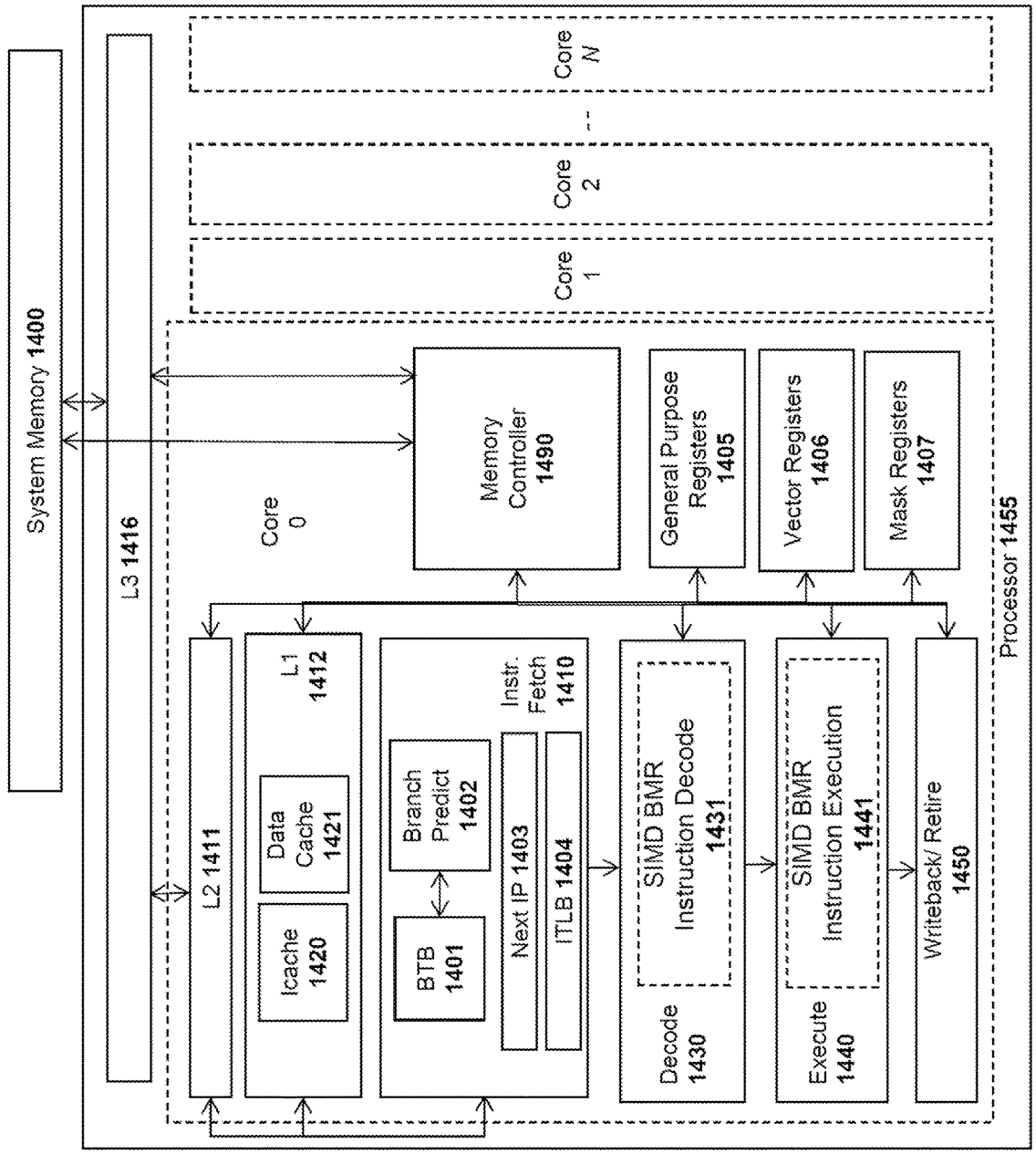
FIG. 14 illustrates a processor architecture on which embodiments of the invention may be implemented.

FIG. 14 illustrates an exemplary processor 1455 on which embodiments of the invention may be implemented. The exemplary processor includes a plurality of cores 0-N for simultaneously executing a plurality of threads. The illustrated embodiment includes SIMD broadcast, move, and reduction (BMR) decode circuitry/logic 1431 within the decoder 1430 for decoding the instructions described herein and SIMD BMR execution circuitry/logic 1441 within the execution unit 1440 for executing the instructions described herein. In response to executing these instructions, a memory controller 1490 may implement the underlying load/store operations by accessing a memory subsystem of the processor which includes a system memory 1400, a Level 3 cache 1416 shared among the cores, and/or other cache levels (e.g., such as L2 cache 1411). While details of only a single core (Core 0) are shown in FIG. 14, it will be understood that each of the other cores of processor 1455 may include similar components.

Prior to describing specific details of the embodiments of the invention, a description of various other components of the exemplary processor 1455 is provided. The plurality of cores 0-N may each include a memory controller 1490 for performing memory operations (e.g., such as load/store operations), a set of general purpose registers (GPRs) 1405, a set of vector registers 1406, and a set of mask registers 1407. In one embodiment, multiple vector data elements are packed into each vector register 1406 which may have a 512 bit width for storing two 256 bit values, four 128 bit values, eight 64 bit values, sixteen 32 bit values, etc. However, the underlying principles of the invention are not limited to any particular size/type of vector data. In one embodiment, the mask registers 1407 include eight 64-bit operand mask registers used for performing bit masking operations on the values stored in the vector registers 1406 (e.g., implemented as mask registers k0-k7 described herein). However, the underlying principles of the invention are not limited to any particular mask register size/type.

Each core 0-N may include a dedicated Level 1 (L1) cache 1412 and Level 2 (L2) cache 1411 for caching instructions and data according to a specified cache management policy. In an alternate embodiment, each L2 cache is shared among two or more cores. The L1 cache 1412 includes a separate instruction cache 1420 for storing instructions and a separate data cache 1421 for storing data. The instructions and data stored within the various processor caches are managed at the granularity of cache lines which may be a fixed size (e.g., 64, 128, 512 Bytes in length). Each core of this exemplary embodiment has an instruction fetch unit 1410 for fetching instructions from main memory 1400 and/or a shared Level 3 (L3) cache 1416. The instruction fetch unit 1410 includes various well known components including a next instruction pointer 1403 for storing the address of the next instruction to be fetched from memory 1400 (or one of the caches); an instruction translation look-aside buffer (ITLB) 1404 for storing a map of recently used virtual-to-physical instruction addresses to improve the speed of address translation; a branch prediction unit 1402 for speculatively predicting instruction branch addresses; and branch target buffers (BTBs) 1401 for storing branch addresses and target addresses.

As mentioned, the decode unit 1430 includes SIMD BMR instruction decode circuitry/logic 1431 for decoding the instructions described herein into micro-operatons or "uops" and the execution unit 1440 includes SIMD BMR instruction execution circuitry/logic 1441 for executing the uops. A writeback/retirement unit 1450 retires the executed instructions and writes back the results.

Turning now to exemplary embodiments, the SIMD BMR instructions may take two sources and/or a split point to allow the necessary SIMD operations to be performed in a single instruction. The example code recited above is repeated here for convenience:

```
for i := 0 to ni
        // Copy a[i] into every element of SIMD vector v1
        v1 = VPBROADCAST(a[i])
        // Set all elements of answer vector to 0
        v4 = VPBROADCAST(0)
        j := 0
        repeat
            // Set mask in element n of mask vector k1 if j + n >= nj
```

-continued

```
        k1 = MASK_REMAINDER(j, nj[i])
        // Load values from memory address b[i] to vector based on
        mask
            v2 = VPMOV(b[i]+j, k1)
            // a[i]+b[j]
            v3 = VPADD(v1,v2)
            // FOO(a[i] + b[i][j])
            v4 = VPADD(v4, FOO(v3), k1)
            j := j + SIMD_WIDTH
        until j > nj[i]
        // Reduce into a single answer
        ans[i] = VPREDUCE(v4,k1,ENUM_SUM);
    endfor
```

In one embodiment of the invention, rather than calculating a mask based on the difference of nj[i] and j, a split point (s=nj[i]−j) is instead determined that can be used to perform SIMD operations with two sources. The new broadcast instruction is referred to herein as VPBROADCAST2, the new move/load instruction is referred to as VPMOV2S, and the new reduction instruction is referred to as VPREDUCE2. These instructions may be used with loop flattening as follows:

$v1 = VPBROADCAST2(a[i],a[i+1],s)$ $v2 = VPMOV2S(b[i]+j,b[i+1],s)$ $ans[i],ans[i+1] = VPREDUCE2(v4,s,ENUM\_SUM);$ Two complications may arise with loop flattening using these instructions. The first is the case where nj<SIMD_WIDTH−1, where two iterations of the outer loop can be insufficient to utilize all vector elements. If this possibility is not known at compile time, a mask may be calculated to ensure safe SIMD operation with unused lanes (see pseudocode with masking below). The other potential complication arises for the last iteration of the outer loop where i+1 should not be used in the SIMD operations. This is easily handled in one embodiment using separate instructions for the last iteration.

Figure 15:
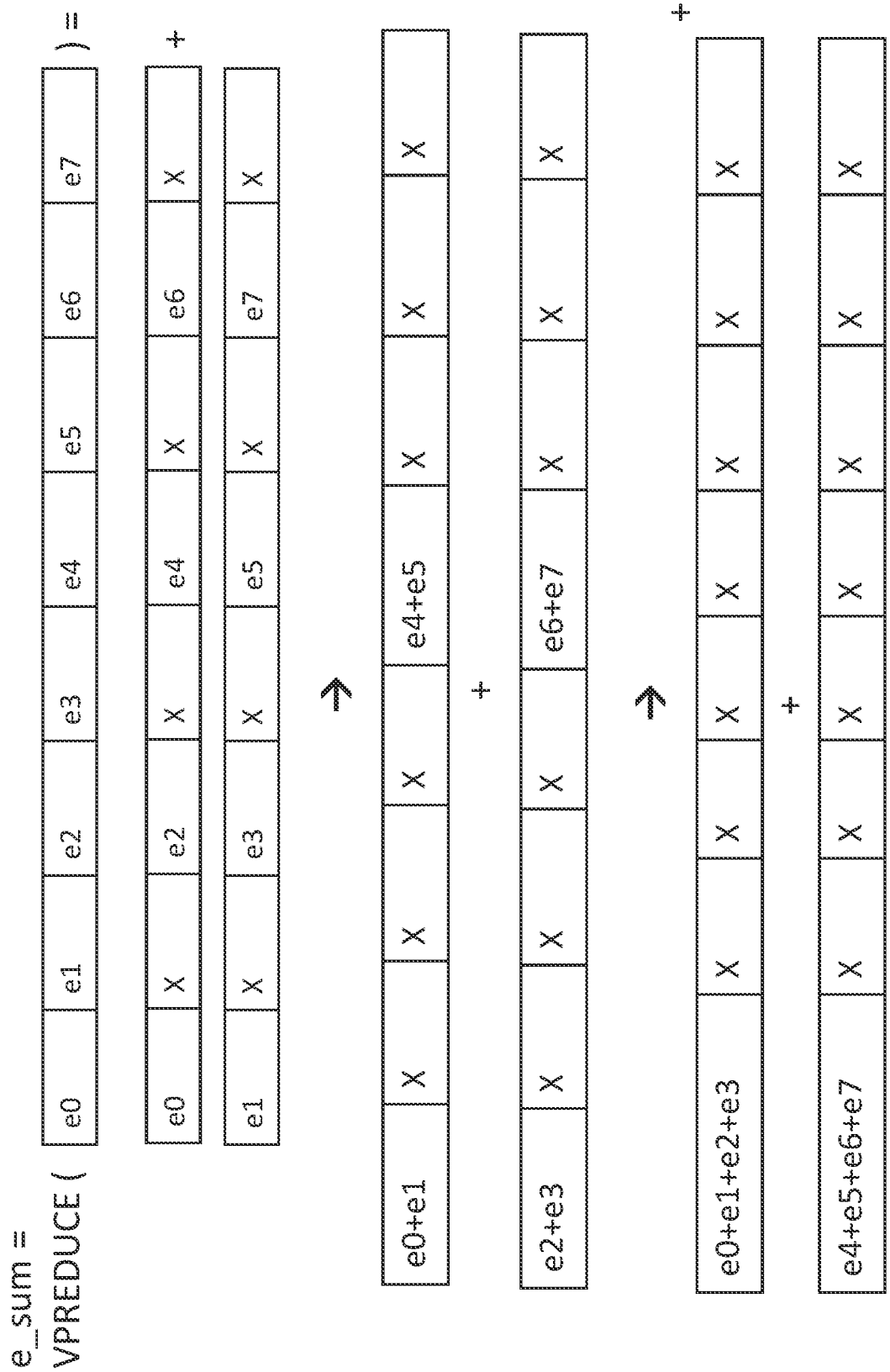
FIG. 15 illustrates data operations performed in response to an exemplary vector reduction instruction.

An analogous optimization (using two sources) may be applied to improve the efficiency of SIMD calculations for reductions that do not involve a split point. FIG. 15 illustrates an exemplary tree reduction for a SIMD vector e0-e7 where X represents unused lanes when conventional SIMD add logic is used.

Often it is the case that multiple reductions are required (e.g. for x and y components). In this case, the reduction can be performed with the same number of SIMD arithmetic operations with two sources. This is illustrated in FIG. 16 which shows a reduction operation with sources e0-e7 and f0-f7 using the VPREDUCE2S reduction instruction.

One embodiment of the two-source broadcast instruction operates in accordance with the following code:

```
    v1 = VPBROADCAST2 (src1, src2, split, k1, v2)
    for i := 0 to 15
        if k1[i] = MASKED
            v1[i] := v2[i]
        else
            if i < split
                v1[i] := src1
            else
                v1[i] := src2
            endif
        endif
    endfor
```

Thus, the VBROADCAST2 instruction sets elements in data lanes for the SIMD vector (v1) to src1 or src2 based on the location of the split (indicated by the split variable). Depending on the implementation, a mask (k1) and a write source SIMD vector (v2) may also be specified, in which case a destination data lane is set to the value in the source vector when the corresponding mask element is set. Alternatively, the destination data lane may be left unchanged where the write source is the destination or no write source is specified. In some implementations, it may also be desirable to restrict the split value to a power of 2 or some other subset of values.

In one embodiment, the two-source broadcast instruction specifies the src1 and src2 elements as consecutive elements in a single register or memory address. In addition, the instruction may operate on multiple data types and bit widths, with or without a mask, a single mask, and/or a write source vector or implied zero source, or two masks and two write source vectors. The underlying principles of the invention are not limited to any particular set of variables for the broadcast instruction.

Figure 17:
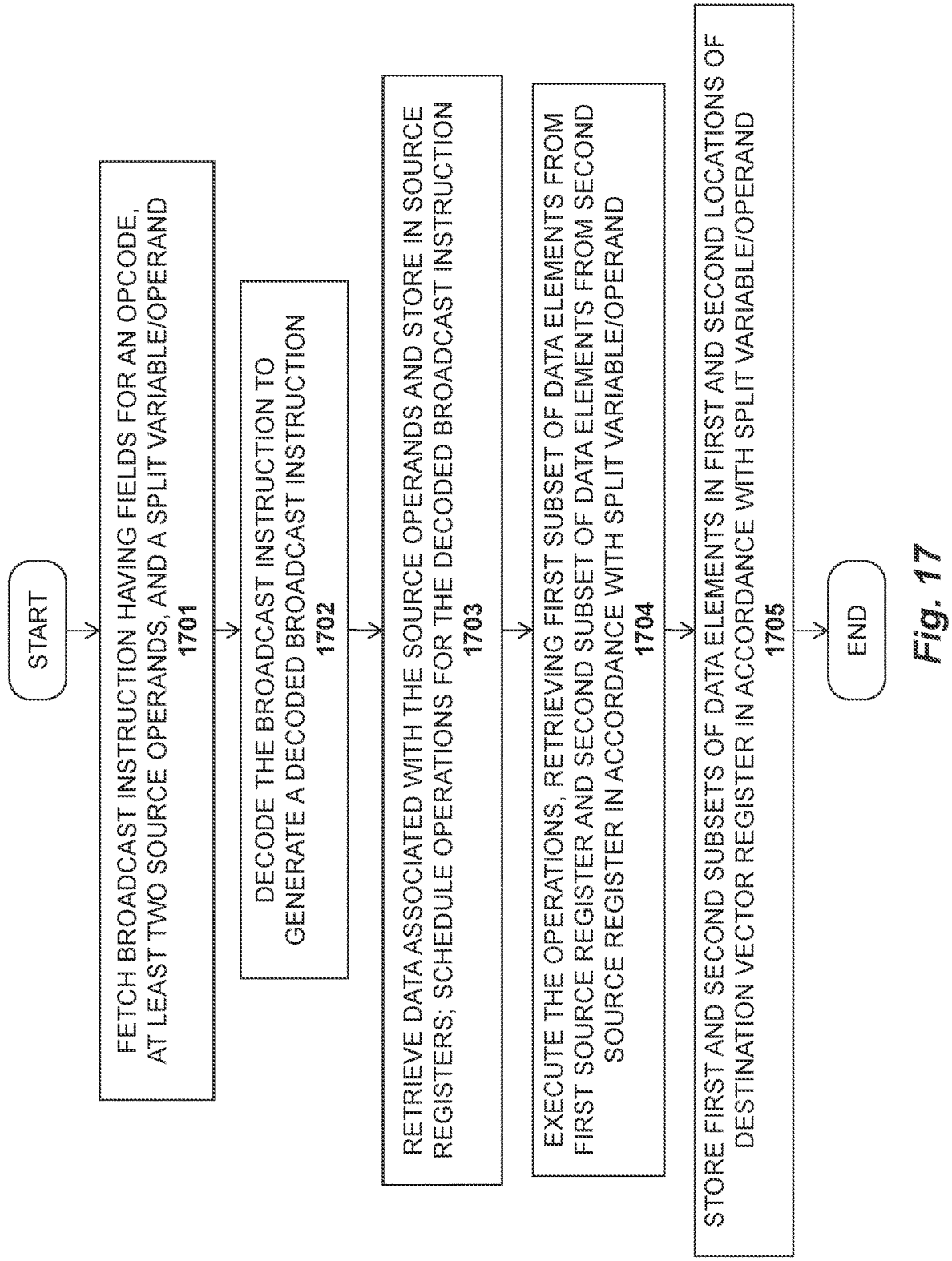
FIGS. 17-19 illustrate method in accordance with different embodiments of the invention.

One embodiment of a method implemented in response to the broadcast instruction is illustrated in FIG. 17. The method may be executed on the architectures described above but is not limited to any particular processor architecture.

At 1701, the broadcast instruction is fetched having fields for an opcode, at least two source operands, and a split variable/operand. The split value may be a variable transmitted with the broadcast instruction (e.g., in an immediate) and/or may be retrieved from a source register. At 1702, the broadcast instruction is decoded to generate a decoded broadcast instruction. In a microcoded implementation, for example, the decoder generates a plurality of microoperations (uops) to be executed by functional units within the execution unit.

At 1703, data associated with the source operands is retrieved (e.g., from memory, cache, etc) and stored in the source registers and the operations generated by the decoded broadcast instruction are scheduled for execution on functional units within the execution unit.

At 1704, the operations are executed, retrieving a first subset of data elements from the first source register and retrieving a second subset of data elements from the second source register in accordance with the split variable/operand. As mentioned, the split value may be read from an immediate of the broadcast instruction or may be stored as a value in another source register.

At 1705, in response to continued execution of the operations, the first and second subsets of data elements are stored in first and second locations of a destination vector register. For example, the first subset may comprise 2 data elements to be stored in the upper 2 data element locations within the destination vector register and the second subset may comprise 6 data elements to be stored in the lower 6 data element locations within the destination vector register. In this example, the split value identifies the split location between the 2 upper data element locations and 6 lower data element locations. The end result is a vector register such as v1 shown in FIG. 13.

One embodiment of a move/load (hereinafter "move") instruction operates in accordance with the following code:

```
    v1 = VPMOV2S (v3, v4, split, k1, v2)
    for i := 0 to SIMD_WIDTH
```

```
if k1[i] = MASKED
    v1[i] := v2[i]
else
    if i < split
        v1[i] := v3[i]
    else
        v1[i] := v4[i-split]
    endif
endif
endfor
```

In the above code, data elements are set in data lanes for the SIMD vector (v1) to the value in the corresponding data lanes of the source SIMD vectors v3 and v4 based on the split. Optionally, a mask (k1) and a write source SIMD vector (v2) can be specified in which case a destination data lane is set to the value in the source vector (v2) when the corresponding mask is set. For example, a bit value of 1 in the mask may use the value from v2 while a bit value of 0 may use the value from v3/v4 (depending on the split). The destination data lane may be unchanged in the case where the write source is the destination or a write source is not specified. Data lanes in the SIMD vectors may be stored in registers or in memory. In some implementations, the split value is restricted to a power of 2 or some other subset and/or there may be a requirement that memory addresses are aligned to a particular number of bytes. As with the broadcast instruction, the split value may be included in an immediate of the instruction or in another source register.

The VPMOV2S instruction may operate on multiple data types and bit widths, with or without a mask, with a single mask, and/or a write source vector or implied zero source, or two masks and two write source vectors. The underlying principles of the invention are not limited to any particular set of variables for the instruction. For source vectors that are a memory address, non-temporal variants that bypass the data cache may be supported.

Figure 18:
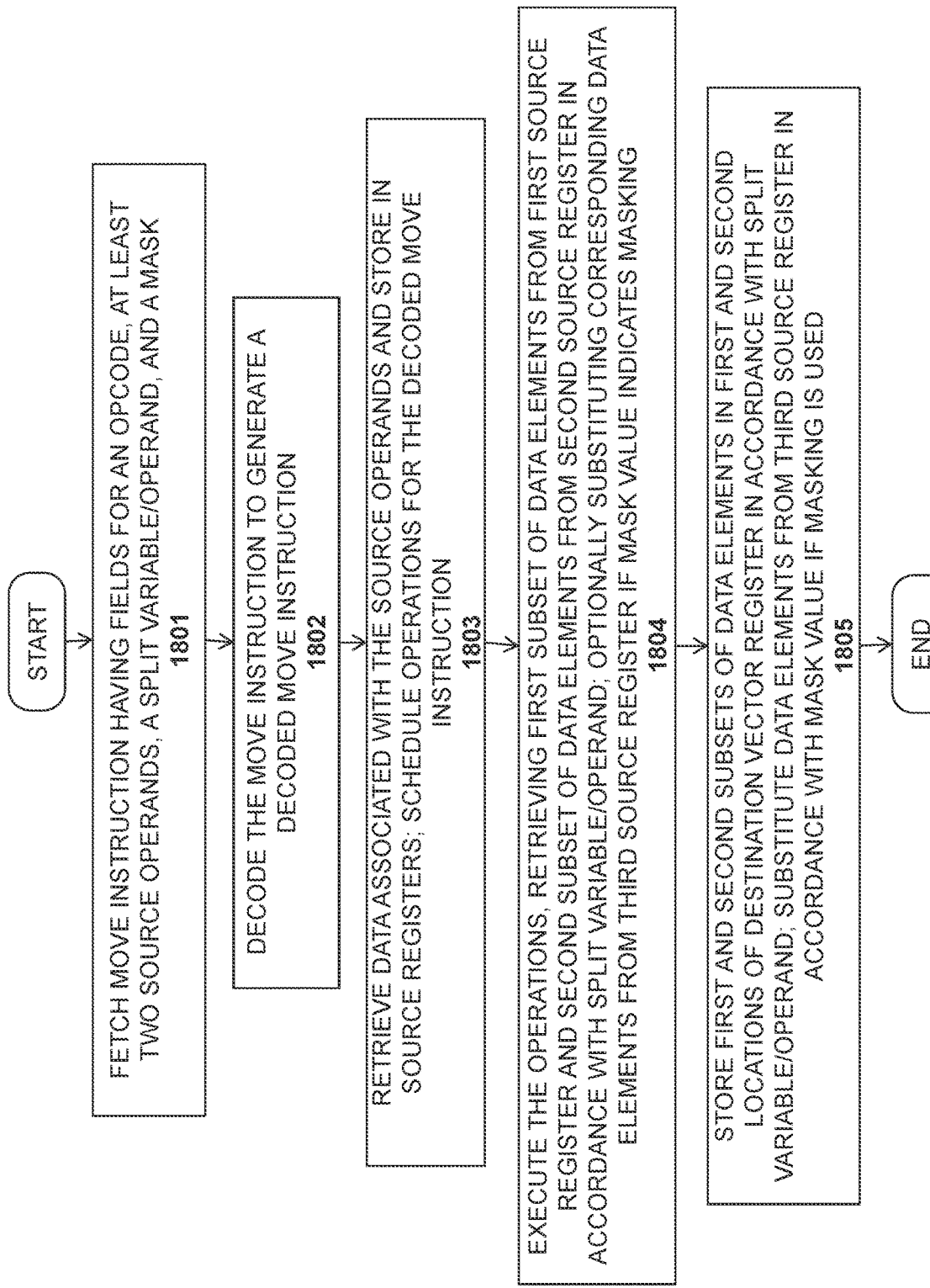

One embodiment of a method implemented in response to the move instruction is illustrated in FIG. 18. The method may be executed on the architectures described above but is not limited to any particular processor architecture.

At 1801, the move instruction is fetched having fields for an opcode, at least two source operands, a split value, and (optionally) a mask value. The split value and/or mask value may be a variable transmitted with the move instruction (e.g., in an immediate) and/or may be retrieved from a source register. At 1802, the move instruction is decoded to generate a decoded move instruction. In a microcoded implementation, for example, the decoder generates a plurality of microoperations (uops) to be executed by functional units within the execution unit.

At 1803, data associated with the source operands is retrieved (e.g., from memory, cache, etc.) and stored in the source registers and the operations generated by the decoded move instruction are scheduled for execution on functional units within the execution unit.

At 1804, the operations are executed, retrieving a first subset of data elements from the first source register and retrieving a second subset of data elements from the second source register in accordance with the split variable/operand and (if used) the mask value. As mentioned, the split value may be read from an immediate of the move instruction or may be stored as a value in another source register. In an implementation which uses a mask value, a separate mask bit may specify whether a corresponding data element is to be read from the first/second source registers (e.g., a mask value of 0) or whether a corresponding data element is to be read from a third source register (i.e., with a mask value of 1). For example, in the above code, if an element is masked, then a corresponding data element is copied from v2 instead of v3 or v4. In an alternate embodiment where zero masking is employed, zeroes are inserted for masked elements instead of data elements from a third source register.

At 1805, in response to continued execution of the operations, the first and second subsets of data elements are stored in first and second locations of a destination vector register, along with data elements from the third source register or zeroes if zero masking is used. For example, the first subset may comprise 2 data elements to be stored in the upper 2 data element locations within the destination vector register and the second subset may comprise 6 data elements to be stored in the lower 6 data element locations within the destination vector register. With masking, values from v2 or zeroes may be used in place of one or more of the 8 data elements retrieved from the first and second source registers.

Another embodiment of a move instruction operates in accordance with the following code:

```
v3, v4 = VPMOV2D(v1, split, k1)
for i := 0 to SIMD_WIDTH
    if k1[i] = UNMASKED
        if i < split
            v3[i] := v1[i]
        else
            v4[i-split] := v1[i]
        endif
    endif
endfor
```

In this embodiment, elements are set in data lanes for destination SIMD vectors (v3, v4) using the value in the corresponding data lane of source SIMD vector v1 in accordance with the split value. In particular, the lower data element positions in v3 are packed with lower data elements from v1 (i.e., below the split value). Once the split value is reached, the lower data element positions in v4 (i.e., v4[1-split]) are packed with upper data elements from v1 (i.e., equal to or above the split value).

A mask value (k1) can optionally be specified in which case the destination lane is left unchanged if the corresponding mask value is set or, alternatively, a write source SIMD vector can be specified in which case a destination data lane is set to the value in the source vector when the corresponding mask is set. Data lanes in SIMD vectors may be stored in registers or in memory. In one embodiment, the split value is restricted to a power of 2 or some other subset and/or memory addresses are required to be aligned to a particular number of bytes.

The VPMOV2D instruction may operate on multiple data types and bit widths, with or without a mask, with a single mask, and/or a write source vector or implied zero source, or two masks and two write source vectors. The underlying principles of the invention are not limited to any particular set of variables for the instruction. For source vectors that are a memory address, non-temporal variants that bypass the data cache may be supported.

One embodiment of a reduction instruction operates in accordance with the following code:

```
ans1, ans2 = VPREDUCE2 (v1, split, k1, v2)
ans1 := 0
ans2 := 0
```

```
        for i := 0 to SIMD_WIDTH
            if i < split
                if k1[i] = UNMASKED
                    ans1 := ans1 + v1[i]
                else
                    ans1 := ans1 + v2[i]
                endif
            se
                if k1[i] = UNMASKED
                    ans2 := ans2 + v1[i]
                else
                    ans2 := ans2 + v2[i]
                endif
            endif
        endfor
```

In this embodiment, the values in data lanes for the source SIMD vectors (v1) are reduced into two values based on the split value. As in the prior embodiments, the split value may be specified in an immediate or another source register. In the example shown, the reduction operator is the addition operator (+) which adds elements of v1 or v2 to form ans1, with v1 or v2 being selected in each iteration based on an associated mask bit. Once the split value is reached, ans2 is similarly determined by adding elements from v1 or v2, once again based on the associated mask bits. The use of mask bits is optional and is not required for compliance with the underlying principles of the invention. Moreover, in one embodiment, a zero value may be used for masked values instead of reading from v2. In one embodiment, the split may be restricted to a power of 2 or some other subset.

Other embodiments of the reduction instruction may also support different reduction operators (e.g. −, *, MAX, MIN), different SIMD vector widths, different data types/element bit widths or two masks and two write source vectors.

Figure 19:
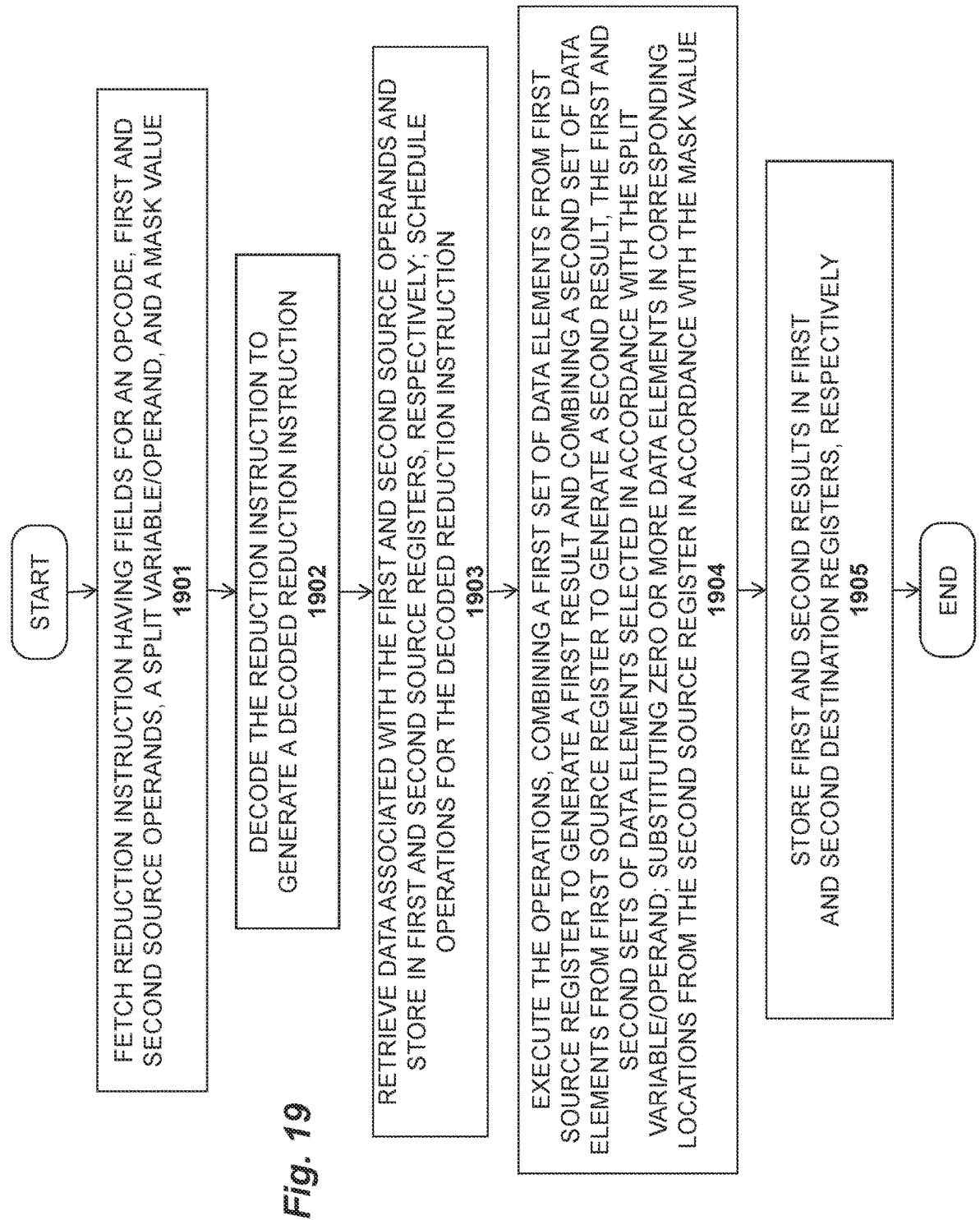

One embodiment of a method implemented in response to the reduction instruction is illustrated in FIG. 19. The method may be executed on the architectures described above but is not limited to any particular processor architecture.

At 1901, the reduction instruction is fetched having fields for an opcode, first and second source operands, a split variable/operand, and (optionally) a mask value. The split value and/or mask value may be a variable transmitted with the reduction instruction (e.g., in an immediate) and/or may be retrieved from another source register. At 1902, the reduction instruction is decoded to generate a decoded reduction instruction. In a microcoded implementation, for example, the decoder generates a plurality of microoperations (uops) to be executed by functional units within the execution unit.

At 1903, data associated with the first and second source operands is retrieved (e.g., from memory, cache, etc.) and stored in the first and second source registers, respectively, and the operations generated by the decoded reduction instruction are scheduled for execution on functional units within the execution unit.

At 1904, the operations are executed, combining a first set of data elements from the first source register to generate a first result and combining a second set of data elements from the first source register to generate a second result. In one embodiment, the first and second sets of data elements are selected in accordance with the split value. For example, the first set of data elements may be the lower data elements of the first source register and the second set of data elements may be the upper data elements in the first source register (subdivided by the split value). In one embodiment, zero or more data elements in corresponding locations from the second source register are substituted for data elements from the first source register based on the mask value. For example, if a mask bit corresponding to a data element is set to 0, then no masking is employed and the corresponding data element is read from the first source register whereas if the mask bit is 1, the corresponding data element from the second source register is read and used to generate the first and/or second result.

At 1905, in response to continued execution of the operations, the first and second results are stored in one or more destination registers. For example, the first and second results may be stored as packed data elements in a first destination register or may be stored in first and second destination registers.

In accordance with the following code, another embodiment of a reduction instruction reduces values from additional source registers based on two mask values:

```
ans1, ans2 = VPREDUCE2S (v1, v2, k1, v3, k2, v4)
ans1 := 0
ans2 := 0
for i := 0 to SIMD_WIDTH
    if k1[i] = UNMASKED
        ans1 := ans1 + v1[i]
    else
        ans1 := ans1 + v3[i]
    endif
    if k2[i] = UNMASKED
        ans2 := ans2 + v2[i]
    else
        ans2 := ans2 + v4[i]
    endif
endfor
```

In the above code, each source SIMD vector, v1 and v2, is reduced into a corresponding single value, ans1 and ans2, respectively. In this particular example, the reduction operator is the addition (+) of data elements from v1 and v2. Optionally, masks k1 and k2 are specified, which indicate whether a particular data element is to be read from mask source registers v3 and v4 instead of corresponding data elements in the source registers v1 and v2, respectively. For example, in one embodiment, a mask value of 0 indicates that the data element is to be read from v1 or v2 and a mask value of 1 indicates that masking is used and the data element is to be read from v3 or v4. In one embodiment, zero masking is employed in place of the values from v3 and v4 (i.e., writing all zeroes in place of the data elements from v1 and v2).

Other embodiments of the reduction instruction may also support different reduction operators (e.g. +, −, *, MAX, MIN), different SIMD vector widths, different data types/element bit widths or two masks and two write source vectors.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
   a decoder configured to decode a move instruction to generate a decoded move instruction identifying a plurality of operations, the move instruction including an opcode, and first and second source operands, the move instruction having a split value associated therewith;
   a first source register associated with the first source operand to store a first plurality of packed data elements;
   a second source register associated with the second source operand to store a second plurality of packed data elements; and
   execution circuitry configured to execute the operations of the decoded move instruction, the execution circuitry configured to select a first set of contiguous data elements from the first source register to generate a first result and configured to select a second set of contiguous data elements from the second source register to generate a second result and to store the first and second results in first and second locations of a destination vector register,
   wherein the execution circuitry is configured to determine the first set of contiguous data elements and the second set of contiguous data elements in accordance with the split value associated with the move instruction.

2. The processor of claim 1 wherein the split value is to be included in an immediate of the move instruction.

3. The processor of claim 1 wherein the split value is to be stored in a third source register.

4. The processor of claim 1 wherein the split value is restricted to a power of 2.

5. The processor of claim 1 wherein the move instruction is to indicate a mask value, the execution circuitry to use the mask value to determine whether to write a zero value to a data element location in the destination vector register instead of one of the first and second sets of contiguous data elements.

6. The processor of claim 1 wherein the move instruction is to indicate a mask value, the execution circuitry to use the mask value to determine whether to write a value from a third source vector register to a data element location in the destination register instead of one of the first and second sets of contiguous data elements.

7. The processor of claim 6 wherein the mask value is to be included in an immediate of the move instruction or stored in a fourth source register.

8. A method comprising:
   decoding a move instruction to generate a decoded move instruction identifying a plurality of operations, the move instruction including an opcode, and first and second source operands, the move instruction having a split value associated therewith;
   storing a first plurality of packed data elements in a first source register associated with the first source operand;
   storing a second plurality of packed data elements in a second source register associated with the second source operand;
   executing the plurality of operations of the decoded move instruction including:
   selecting a first set of contiguous data elements from the first source register to generate a first result,
   selecting a second set of contiguous data elements from the second source register to generate a second result, and
   storing the first and second results in a destination register,
   wherein the first set of contiguous data elements and the second set of contiguous data elements are determined in accordance with the split value associated with the move instruction.

9. The method of claim 8 wherein the split value is to be included in an immediate of the move instruction.

10. The method of claim 8 wherein the split value is to be stored in a third source register.

11. The method of claim 8 wherein the split value is to be restricted to a power of 2.

12. The method of claim 11 wherein the move instruction is to indicate a mask value, the execution circuitry to use the mask value to determine whether to write a zero value to a data element location in the destination register instead of one of the first and second sets of contiguous data elements.

13. The method of claim 8 wherein the move instruction is to indicate a mask value, the execution circuitry to use the mask value to determine whether to write a value from a third source vector register to a data element location in the destination register instead of one of the first and second sets of contiguous data elements.

14. The method of claim 13 wherein the mask value is to be included in an immediate of the move instruction or stored in a fourth source register.

15. A non-transitory machine-readable medium having program code stored thereon which, when executed by a machine, causes the machine to perform the operations of:
   decoding a move instruction to generate a decoded move instruction identifying a plurality of operations, the move instruction including an opcode, and first and second source operands, the move instruction having a split value associated therewith;
   storing a first plurality of packed data elements in a first source register associated with the first source operand;
   storing a second plurality of packed data elements in a second source register associated with the second source operand;
   executing the plurality of operations of the decoded move instruction including:
   selecting a first set of contiguous data elements from the first source register to generate a first result,
   selecting a second set of contiguous data elements from the second source register to generate a second result, and
   storing the first and second results in a destination register,
   wherein the first set of contiguous data elements and the second set of contiguous data elements are determined in accordance with the split value associated with the move instruction.

16. The non-transitory machine-readable medium of claim 15 wherein the split value is to be included in an immediate of the move instruction.

17. The non-transitory machine-readable medium of claim 15 wherein the split value is to be stored in a third source register.

18. The non-transitory machine-readable medium of claim 15 wherein the split value is to be restricted to a power of 2.

19. The non-transitory machine-readable medium of claim 18 wherein the move instruction is to indicate a mask value, the execution circuitry to use the mask value to determine whether to write a zero value to a data element location in the destination register instead of one of the first and second sets of contiguous data elements.

20. The non-transitory machine-readable medium of claim 15 wherein the move instruction is to indicate a mask value, the execution circuitry to use the mask value to determine whether to write a value from a third source vector register to a data element location in the destination register instead of one of the first and second sets of contiguous data elements.

21. The non-transitory machine-readable medium of claim 20 wherein the mask value is to be included in an immediate of the move instruction or stored in a fourth source register.

* * * * *